United States Patent
Josephson

(10) Patent No.: US 10,628,977 B2
(45) Date of Patent: Apr. 21, 2020

(54) MOTION BASED CALENDARING, MAPPING, AND EVENT INFORMATION COORDINATION AND INTERACTION INTERFACES, APPARATUSES, SYSTEMS, AND METHODS MAKING AND IMPLEMENTING SAME

(71) Applicant: Quantum Interface, LLC, Austin, TX (US)

(72) Inventor: Jonathan Josephson, Austin, TX (US)

(*) Notice: Subject to any disclaimer, the term of this patent is extended or adjusted under 35 U.S.C. 154(b) by 0 days.

(21) Appl. No.: 16/148,971

(22) Filed: Oct. 1, 2018

(65) Prior Publication Data
US 2019/0102919 A1 Apr. 4, 2019

Related U.S. Application Data

(60) Provisional application No. 62/566,479, filed on Oct. 1, 2017.

(51) Int. Cl.
G06T 11/20 (2006.01)
G06Q 10/10 (2012.01)
G06T 11/60 (2006.01)
G06F 3/0481 (2013.01)

(52) U.S. Cl.
CPC ........ *G06T 11/203* (2013.01); *G06Q 10/1095* (2013.01); *G06T 11/60* (2013.01); *G06F 3/04817* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2006/0174211 A1* | 8/2006 | Hoellerer | G01C 21/20 715/782 |
| 2014/0343834 A1* | 11/2014 | DeMerchant | G01S 5/0027 701/300 |
| 2015/0065107 A1* | 3/2015 | Dave | H04M 1/72572 455/418 |

* cited by examiner

*Primary Examiner* — Said Broome
(74) *Attorney, Agent, or Firm* — Robert W. Strozier

(57) ABSTRACT

Apparatuses, systems, interfaces, and methods using motion based processing to display, manipulate, coordinate, and/or evidence interaction between calendar and map data or calendar, map, and optionally event data, and methods making and implementing same.

20 Claims, 16 Drawing Sheets

MOTION BASED CALENDARING, MAPPING, AND EVENT INFORMATION COORDINATION AND INTERACTION INTERFACES, APPARATUSES, SYSTEMS, AND METHODS MAKING AND IMPLEMENTING SAME

RELATED APPLICATIONS

This application claims the benefit of and priority to U.S. Provisional Patent Application Ser. No. 62/566,479 filed 1 Oct. 2017.

BACKGROUND OF THE INVENTION

1. Field of the Invention

Embodiments of the present disclosure relate to apparatuses, systems, interfaces, and methods using relational, interactive, and motion based processing including holds and timed events, to display, manipulate, coordinate, and/or evidence interaction between scheduler, event schedule, calendar, and map data or scheduler, event schedule calendar, map, and event data, and methods making and implementing same.

In particular, embodiments of the present disclosure relate to interfaces, systems and methods using relational, interactive, motion based calendaring, mapping, and event information coordination and interaction interfaces, apparatuses, systems, and methods making and using same, wherein the interfaces/apparatuses/systems include at least one sensor capable of sensing motion, at least one processing unit, at least one display devices, and a power supply and the methods receive sensor data corresponding to motion sensed by the sensor and processing the motion into command functions to coordinated and/or interact with calendar data, location or map data, and optionally event data.

2. Description of the Related Art

While many systems and methods have been purposed for allowing users to interact with virtual reality environments, there is still a need in the art for improved systems and methods for interacting with virtual reality environments.

SUMMARY OF THE INVENTION

Embodiments of this disclosure provide apparatuses, systems and interfaces including at least one motion sensor, at least one processing unit, at least one display devices, and a power supply and the methods to receive sensor data corresponding to motion sensed by the sensor and processing the motion into command functions to coordinated and/or interact with calendar data, location or map data, and optionally event data. The apparatuses, systems and interfaces are configured to receive output from the at least one motion sensor relating to location and motion within a 2D or 3D construct capable of simultaneously displaying calendar and map data. In certain embodiments, the 2D or 3D construct capable of simultaneously displaying calendar, map, and event data.

Embodiments of this disclosure provide methods using an apparatuses, systems and interfaces of this disclosure, where the methods include sensing location and sensing motion in an active zone of a motion sensor, causing a processing unit to display a calendar in a first display window and a map in a second display window of a display device, and causing the processing unit to scroll through a list of events set forth in the calendar. The methods also include sensing a second motion, which may be a hold over a particular calendar event or a change in direction of motion over a particular calendar event, and causing the processing unit to draw a line or light beam or other means of providing relational data from the map to a list of locations, the event to a location on the map corresponding to the event location, the calendar to an event(s), or the event(s) to the map, or any combination or multiples of these. These aspects may be thought of as dimensions of a scheduler, and these dimensions may each be represented on their own plan, or overlapping planes, or volumes. These dimensions are typically aligned with an axis, so in this scheduler example, the 3 axes may represent map (geo location), calendar (or temporal data) and event (informational data). In certain embodiments, the systems may also include contacts, messages, and calls so that the data may be used for a new type of contact manager, and any axes could be replaces with maps, calendars, event info, or other data.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1A:
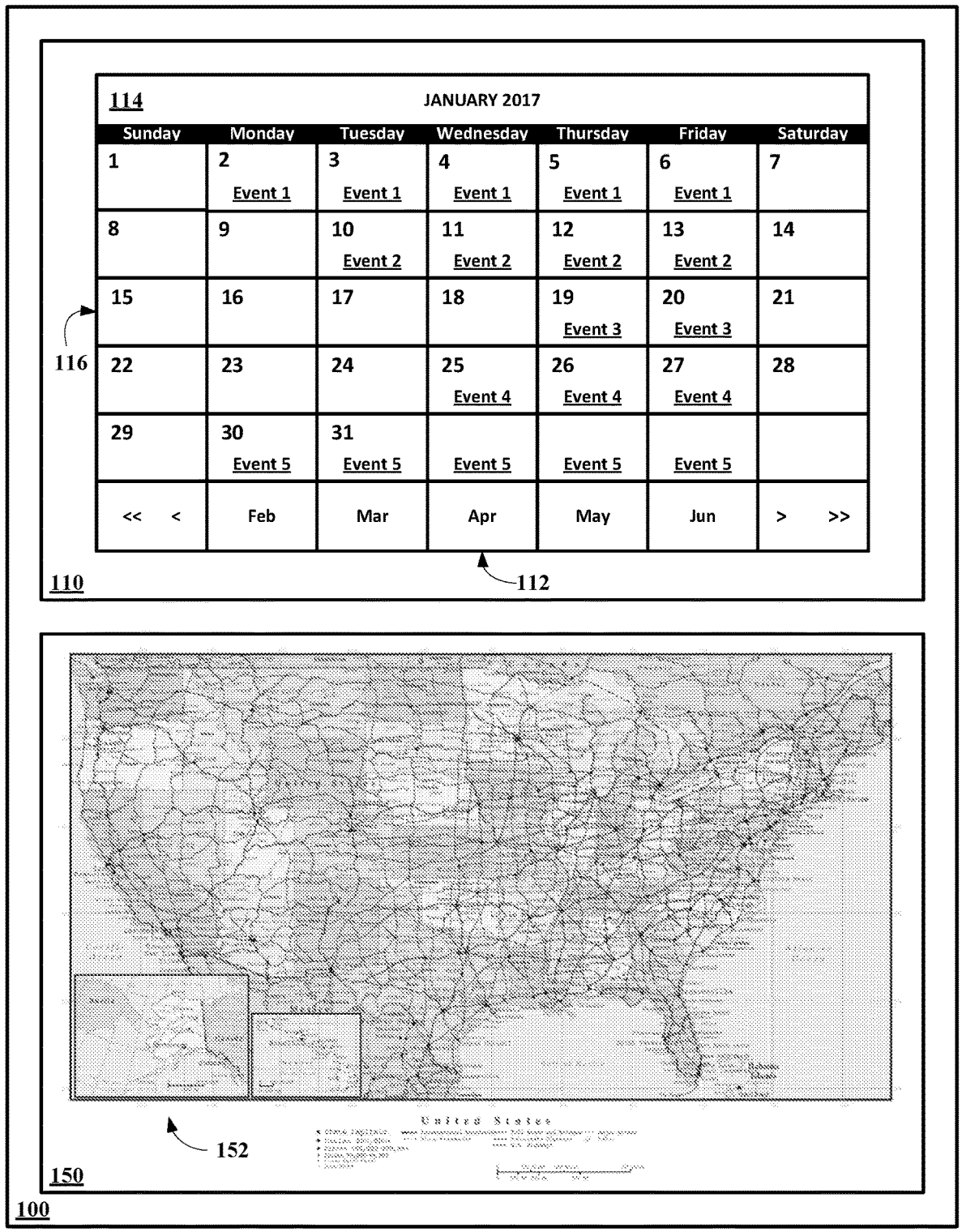
FIGS. 1A-D depict a sequence of flat or 2D displayed map and calendar showing visualization of associated calendar and map data and interactions thereof.

The term "at least one" means one or more or one or a plurality, additionally, these three terms may be used interchangeably within this application. For example, at least one device means one or more devices or one device and a plurality of devices.

The term "one or a plurality" means one item or a plurality of items.

The term "about" means that a value of a given quantity is within +20% of the stated value. In other embodiments, the value is within +15% of the stated value. In other embodiments, the value is within +10% of the stated value. In other embodiments, the value is within +5% of the stated value. In other embodiments, the value is within +2.5% of the stated value. In other embodiments, the value is within +1% of the stated value.

The term "substantially" means that a value of a given quantity is within +5% of the stated value. In other embodiments, the value is within +2.5% of the stated value. In other embodiments, the value is within +2% of the stated value. In other embodiments, the value is within +1% of the stated value. In other embodiments, the value is within +0.1% of the stated value.

The term "motion" and "movement" are often used interchangeably and mean motion or movement that is capable of being detected by a motion sensor within an active zone of the sensor. Thus, if the sensor is a forward viewing sensor and is capable of sensing motion within a forward extending conical active zone, then movement of anything within that active zone that meets certain threshold detection criteria, will result in a motion sensor output, where the output may include at least direction, angle, distance/displacement, duration, velocity, and/or acceleration. This may include the use of gestures for interaction as well, as gestures are a subset of motion events. Moreover, if the sensor is a touch screen or multitouch screen sensor and is capable of sensing motion on its sensing surface, then movement of anything on that active zone that meets certain threshold detection criteria, will result in a motion sensor output, where the output may include at least direction, angle, distance/displacement, duration, velocity, and/or acceleration. Of course, the sensors do not need to have threshold detection criteria, but may simply generate output anytime motion or any kind is detected. The processing units can then determine whether the motion is an actionable motion or movement and a non-actionable motion or movement.

The term "motion sensor" or "motion sensing component" means any sensor or component capable of sensing motion of any kind by anything with an active zone area or volume, regardless of whether the sensor's or component's primary function is motion sensing. Of course, the same is true of sensor arrays regardless of the types of sensors in the arrays or for any combination of sensors and sensor arrays.

The term "eye tracking sensor" means any sensor capable of tracking eye movement such as eye tracking glasses, eye tracking cameras, or any other eye tracking sensor.

The term "real object" or "real world object" means any real world device, attribute, or article that is capable of being controlled by a processing unit. Real objects include objects or articles that have real world presence including physical, mechanical, electro-mechanical, magnetic, electro-magnetic, electrical, or electronic devices or any other real world device that can be controlled by a processing unit.

The term "virtual object" means any construct generated in or attribute associated with a virtual world or by a computer and displayed by a display device and that are capable of being controlled by a processing unit. Virtual objects include objects that have no real world presence, but are still controllable by a processing unit. These objects include elements within a software system, product or program such as icons, list elements, menu elements, applications, files, folders, archives, generated graphic objects, 1D, 2D, 3D, and/or nD graphic images or objects, generated real world objects such as generated people, generated animals, generated devices, generated plants, generated landscapes and landscape objects, generate seascapes and seascape objects, generated skyscapes or skyscape objects, 1D, 2D, 3D, and/or nD zones, 2D, 3D, and/or nD areas, 1D, 2D, 3D, and/or nD groups of zones, 2D, 3D, and/or nD groups or areas, volumes, attributes such as characteristics, quantity, shape, zonal, field, affecting influence changes or the like, or any other generated real world or imaginary objects or attributes. Augmented reality is a combination of real and virtual objects and attributes.

The term "entity" means a human or an animal or robot or robotic system (autonomous or non-autonomous.

The term "entity object" means a human or a part of a human (fingers, hands, toes, feet, arms, legs, eyes, head, body, etc.), an animal or a port of an animal (fingers, hands, toes, feet, arms, legs, eyes, head, body, etc.), or a real world object under the control of a human or an animal or a robot and include such articles as pointers, sticks, or any other real world object that can be directly or indirectly controlled by a human or animal or a robot.

The term "mixtures" mean different data or data types are mixed together.

The term "combinations" mean different data or data types are in packets or bundles, but separate.

The term "sensor data" mean data derived from at least one sensor including user data, motion data, environment data, temporal data, contextual data, historical data, or mixtures and combinations thereof.

The term "user data" mean user attributes, attributes of entities under the control of the user, attributes of members under the control of the user, information or contextual information associated with the user, or mixtures and combinations thereof.

The terms "user features", "entity features", and "member features" means features including: overall user, entity, or member shape, texture, proportions, information, matter, energy, state, layer, size, surface, zone, area, any other overall feature, and mixtures or combinations thereof; specific user, entity, or member part shape, texture, proportions, any other part feature, and mixtures or combinations thereof; and particular user, entity, or member dynamic shape, texture, proportions, any other part feature, and mixtures or combinations thereof; and mixtures or combinations thereof.

The term "motion data or movement data" mean one or a plurality of motion or movement properties detectable by motion sensor or sensors capable of sensing movement.

The term "motion or movement properties" mean properties associated with the motion data including motion/movement direction (linear, curvilinear, circular, elliptical, etc.), motion/movement distance/displacement, motion/movement duration, motion/movement velocity (linear, angular, etc.), motion/movement acceleration (linear, angular, etc.), motion signature manner of motion/movement (motion/movement properties associated with the user, users, objects, areas, zones, or combinations of thereof), dynamic motion properties such as motion in a given situation, motion learned by the systems based on user interaction with the systems, motion characteristics based on the dynamics of the environment, influences or affectations, changes in any of these attributes, and mixtures or combinations thereof. Motion or movement based data is not restricted to the movement of a single body, body part, and/or member under the control of an entity, but may include movement of one or any combination of movements. Additionally, the actual body, body part and/or member's identity is also considered a movement attribute. Thus, the systems/apparatuses, and/or interfaces of this disclosure may use the identity of the body, body part and/or member to select between different set of objects that have been pre-defined or determined base on environment, context, and/or temporal data.

The term "gesture" means a predefined movement or posture preformed in a particular manner such as closing a fist lifting a finger that is captured compared to a set of predefined movements that are tied via a lookup table to a single function and if and only if, the movement is one of the predefined movements does a gesture based system actually go to the lookup and invoke the predefined function.

The term "environment data" mean data associated with the user's surrounding or environment such as location (GPS, etc.), type of location (home, office, store, highway, road, etc.), extent of the location, context, frequency of use or reference, and mixtures or combinations thereof.

The term "temporal data" mean data associated with time of day, day of month, month of year, any other temporal data, and mixtures or combinations thereof.

The term "contextual data" mean data associated with user activities, environment activities, environmental states, frequency of use or association, orientation of objects, devices or users, association with other devices and systems, temporal activities, and mixtures or combinations thereof.

The term "historical data" means data associated with past events and characteristics of the user, the objects, the environment and the context, or any combinations thereof.

The term "simultaneous" or "simultaneously" means that an action occurs either at the same time or within a small period of time. Thus, a sequence of events are considered to be simultaneous if they occur concurrently or at the same time or occur in rapid succession over a short period of time, where the short period of time ranges from about 1 nanosecond to 5 second. In other embodiments, the period range from about 1 nanosecond to 1 second. In other embodiments, the period range from about 1 nanosecond to 0.5 seconds. In other embodiments, the period range from about 1 nanosecond to 0.1 seconds. In other embodiments, the period range from about 1 nanosecond to 1 millisecond. In other embodiments, the period range from about 1 nanosecond to 1 microsecond.

The term "and/or" means mixtures or combinations thereof so that whether an and/or connectors is used, the and/or in the phrase or clause or sentence may end with "and mixtures or combinations thereof.

The term "spaced apart" means that objects displayed in a window of a display device are separated one from another in a manner that improves an ability for the systems, apparatuses, and/or interfaces to discriminate between object based on movement sensed by motion sensors associated with the systems, apparatuses, and/or interfaces.

The term "maximally spaced apart" means that objects displayed in a window of a display device are separated one from another in a manner that maximized a separation between the object to improve an ability for the systems, apparatuses, and/or interfaces to discriminate between object based on movement sensed by motion sensors associated with the systems, apparatuses, and/or interfaces.

The term "hold" means to remain stationary at a display location for a finite duration generally between about 1 µs to about 1 s.

The term "brief hold" means to remain stationary at a display location for a finite duration generally between about 1 µs to about 1 ms.

The term "microhold" or micro duration hold" means to remain stationary at a display location for a finite duration generally between about 1 µs to about 500 µs. In certain embodiments, the microhold is between about 10 µs to about 500 µs. In certain embodiments, the microhold is between about 100 µs to about 500 µs. In certain embodiments, the microhold is between about 200 µs to about 500 µs.

DETAILED DESCRIPTION OF THE INVENTION

The inventors have found that motion-based apparatuses, interfaces, systems and methods for displaying, manipulating, and interacting with scheduler, calendar, map, and optionally event data may be implemented, wherein the interfaces/apparatuses/systems include at least one motion sensor, at least one processing unit, at least one display devices, and a power supply and the methods receive sensor data corresponding to motion sensed by the sensor and processing the motion into command functions to coordinated and/or interact with calendar data, location or map data, and optionally event data. In certain embodiments, the apparatuses, interfaces, systems and methods may be integrated with mapping applications so that the apparatuses, interfaces, systems and methods will allow the user to view restaurants, stores, gas stations, or other retail establishments in proximity of the venue or to provide information to a user on traveling to and from hotels and the venue or any other type of interactive map function. In other embodiments, the apparatuses, interfaces, systems and methods may be integrated with interactive 3-D venue applications that will permit the user to view the actual layout of the venue. In other embodiments, the calendar, map, and event data may be interactive so that the calendar, map, and event data may be free form so that motion based event selection and correlated venue location and event data may be distributed in free form as well.

Motion Based Calendaring Interfaces

Embodiments of this disclosure broadly relate to methods comprising receiving first input from a motion sensor; displaying a calendar and a map in response to the first input, where the calendar includes a plurality of events and the map correlates with event locations; determining that the first input corresponds to motion towards a particular event on the calendar; and generating a ray or beam emanating from the particular event to a location on the map corresponding to the location of the particular event. In certain embodiments, the methods further comprise receiving a further input from the motion sensor; determining that the further input corresponds to motion towards a further event on the calendar; and generating a further ray or beam emanating from the further particular event to a further location on the map corresponding to the location of the further particular event. In other embodiments, the methods further comprise generating a line connecting the first location to the further location evidencing a direction of travel from the first location to the further location.

In other embodiments, the methods further comprise repeating the steps of claims 1 and 2 until all desired events and associated with rays or beams are displayed on the display device. In other embodiments, the methods further comprise repeating the steps of claims 1, 2 and 3 until all desired events and associated with rays or beams and all connecting lines are displayed on the display device. In other embodiments, the methods further comprise displaying event related data in a event data field on the display. In other embodiments, the methods further comprise displaying event related data in a event data field on the display. In other embodiments, the methods further comprise displaying event related data in a event data field on the display. In other embodiments, the calendar and the map are displayed in a two dimensional format with the calendar displayed on top of the map or the map is displayed on top of the calendar. In other embodiments, the calendar and the map are displayed in a three dimensional format with the map displayed in a xz-plane and the calendar displayed in an xy-plane. In other embodiments, the map, and the event are displayed in a two dimensional format with (a) the calendar displayed on top of the map and the map on top of the event data field or (b) the map is displayed on top of the calendar and the calendar on top of the event data field. In other embodiments, the the calendar and the map are displayed in a three dimensional format with the map displayed in a xz-plane, the calendar displayed in an xy-plane, and the even data field is displayed on a yz-plane. In other embodiments, the methods further comprise displaying lines extending from events to event data displayed on in the event data field and lines extending from the associated locations to the event data displayed in the event data field on the display. In other embodiments, the methods further comprise displaying lines extending from events to event data displayed on in the event data field and lines extending from the associated locations to the event data displayed in the event data field on the display.

Embodiments of this disclosure broadly relate to mobile devices comprising a display device; and a processor configured to (a) responsive to first input, initiate display of a calendar and a map on the display device, where the calendar includes a plurality of events and the map correlates with event locations; and (b) responsive to the first input determine that first input corresponds to motion towards a particular event on the calendar and generate a ray or beam emanating from the particular event to a location on the map corresponding to the location of the particular event. In certain embodiments, the devices may implement any of the methods steps set forth above.

Embodiments of this disclosure broadly relate to system comprising a display device configured to (a) display a calendar and a map in two-dimensions or in three-dimensions; and a processor, coupled to the display device and configured to (a) receive a first input from a motion sensor, (b) cause the display device to display the calendar and the map, where the calendar includes a plurality of events and the map correlates with event locations, and (c) in response to the first input determine that first input corresponds to motion towards a particular event on the calendar and generate a ray or beam emanating from the particular event to a location on the map corresponding to the location of the particular event. In certain embodiments, the systems may implement any of the methods steps set forth above.

General Motion Based Interfaces

The inventors have also found that selection attractive or manipulative apparatuses, systems, and/or interfaces may be constructed that use motion or movement within an active sensor zone of a motion sensor translated to motion or movement of a selection object on or within a user feedback device: 1) to discriminate between selectable objects based on the motion, 2) to attract target selectable objects towards the selection object based on properties of the sensed motion including direction, speed, acceleration, or changes thereof, and 3) to select and simultaneously activate a particular or target selectable object or a specific group of selectable objects or controllable area or an attribute or attributes upon "contact" of the selection object with the target selectable object(s), where contact means that: 1) the selection object actually touches or moves inside the target selectable object, 2) touches or moves inside an active zone (area or volume) surrounding the target selectable object, 3) the selection object and the target selectable object merge, 4) a triggering event occurs based on a close approach to the target selectable object or its associated active zone or 5) a triggering event based on a predicted selection meeting a threshold certainty. The touch, merge, or triggering event causes the processing unit to select and activate the object, select and active object attribute lists, select, activate and adjustments of an adjustable attribute. The objects may represent real and/or virtual objects including: 1) real world devices under the control of the apparatuses, systems, or interfaces, 2) real world device attributes and real world device controllable attributes, 3) software including software products, software systems, software components, software objects, software attributes, active areas of sensors, 4) generated EMF fields, RF fields, microwave fields, or other generated fields, 5) electromagnetic waveforms, sonic waveforms, ultrasonic waveforms, and/or 6) mixture and combinations thereof. The apparatuses, systems and interfaces of this invention may also include remote control units in wired or wireless communication therewith. The inventor has also found that a velocity (speed and direction) of motion or movement can be used by the apparatuses, systems, or interfaces to pull or attract one or a group of selectable objects toward a selection object and increasing speed may be used to increase a rate of the attraction of the objects, while decreasing motion speed may be used to slower a rate of attraction of the objects. The inventors have also found that as the attracted object move toward the selection object, they may be augmented in some way such as changed size, changed color, changed shape, changed line thickness of the form of the object, highlighted, changed to blinking, or combinations thereof. Simultaneously, synchronously or asynchronously, submenus or subobjects may also move or change in relation to the movements or changes of the selected objects. Simultaneously, synchronously or asynchronously, the non-selected objects may move away from the selection object(s). It should be noted that whenever a word object is used, it also includes the meaning of objects, and these objects may be simultaneously performing separate, simultaneous, and/or combined command functions or used by the processing units to issue combinational functions.

In certain embodiments, as the selection object moves toward a target object, the target object will get bigger as it moves toward the selection object. It is important to conceptualize the effect we are looking for. The effect may be analogized to the effects of gravity on objects in space. Two objects in space are attracted to each other by gravity proportional to the product of their masses and inversely proportional to the square of the distance between the objects. As the objects move toward each other, the gravitational force increases pulling them toward each other faster and faster. The rate of attraction increases as the distance decreases, and they become larger as they get closer. Contrarily, if the objects are close and one is moved away, the gravitational force decreases and the objects get smaller. In the present invention, motion of the selection object away from a selectable object may act as a rest, returning the display back to the original selection screen or back to the last selection screen much like a "back" or "undo" event. Thus, if the user feedback unit (e.g., display) is one level down from the top display, then movement away from any selectable object, would restore the display back to the main level. If the display was at some sublevel, then movement away from selectable objects in this sublevel would move up a sublevel. Thus, motion away from selectable objects acts to drill up, while motion toward selectable objects that have sublevels results in a drill down operation. Of course, if the selectable object is directly activatable, then motion toward it selects and activates it. Thus, if the object is an executable routine such as taking a picture, then contact with the selection object, contact with its active area, or triggered by a predictive threshold certainty selection selects and simultaneously activates the object. Once the interface is activated, the selection object and a default menu of items may be activated on or within the user feedback unit. If the direction of motion towards the selectable object or proximity to the active area around the selectable object is such that the probability of selection is increased, the default menu of items may appear or move into a selectable position, or take the place of the initial object before the object is actually selected such that by moving into the active area or by moving in a direction such that a commit to the object occurs, and simultaneously causes the subobjects or submenus to move into a position ready to be selected by just moving in their direction to cause selection or activation or both, or by moving in their direction until reaching an active area in proximity to the objects such that selection, activation or a combination of the two occurs. The selection object and the selectable objects (menu objects) are each assigned a mass equivalent or gravitational value of 1. The difference between what happens as the selection object moves in the display area towards a selectable object in the present interface, as opposed to real life, is that the selectable objects only feel the gravitation effect from the selection object and not from the other selectable objects. Thus, in the present invention, the selectable object is an attractor, while the selectable objects are non-interactive, or possibly even repulsive to each other. So as the selection object is moved in response to motion by a user within the motion sensors active zone such as motion of a finger in the active zone the processing unit maps the motion and generates corresponding movement or motion of the selection object towards selectable objects in the general direction of the motion. The processing unit then determines the projected direction of motion and based on the projected direction of motion, allows the gravitational field or attractive force of the selection object to be felt by the predicted selectable object or objects that are most closely aligned with the direction of motion. These objects may also include submenus or sub-objects that move in relation to the movement of the selected object(s). This effect would be much like a field moving and expanding or fields interacting with fields, where the objects inside the field(s) would spread apart and move such that unique angles from the selection object become present so movement towards a selectable object or group of objects can be discerned from movement towards a different object or group of objects, or continued motion in the direction of the second or more of objects in a line would cause the objects to not be selected that had been touched or had close proximity, but rather the selection would be made when the motion stops, or the last object in the direction of motion is reached, and it would be selected. The processing unit causes the display to move those object toward the selectable object. The manner in which the selectable object moves may be to move at a constant velocity towards a selection object or to accelerate toward the selection object with the magnitude of the acceleration increasing as the movement focuses in on the selectable object. The distance moved by the person and the speed or acceleration may further compound the rate of attraction or movement of the selectable object towards the selection object. In certain situations, a negative attractive force or gravitational effect may be used when it is more desired that the selected objects move away from the user. Such motion of the objects would be opposite of that described above as attractive. As motion continues, the processing unit is able to better discriminate between competing selectable objects and the one or ones more closely aligned are pulled closer and separated, while others recede back to their original positions or are removed or fade. If the motion is directly toward a particular selectable object with a certainty above a threshold value, which has a certainty of greater than 50%, then the selection and selectable objects merge and the selectable object is simultaneously selected and activated. Alternatively, the selectable object may be selected prior to merging with the selection object if the direction, speed and/or acceleration of the selection object is such that the probability of the selectable object is enough to cause selection, or if the movement is such that proximity to the activation area surrounding the selectable object is such that the threshold for selection, activation or both occurs. Motion continues until the processing unit is able to determine that a selectable object has a selection threshold of greater than 50%, meaning that it more likely than not the correct target object has been selected. In certain embodiments, the selection threshold will be at least 60%. In other embodiments, the selection threshold will be at least 70%. In other embodiments, the selection threshold will be at least 80%. In yet other embodiments, the selection threshold will be at least 90%.

In certain embodiments, the selection object will actually appear on the display screen, while in other embodiments, the selection object will exist only virtually in the processor software. For example, for motion sensors that require physical contact for activation such as touch screens, the selection object may be displayed and/or virtual, with motion on the screen used to determine which selectable objects from a default collection of selectable objects will be moved toward a perceived or predefined location of a virtual section object or toward the selection object in the case of a displayed selection object, while a virtual object simply exists in software such as at a center of the display or a default position to which selectable object are attracted, when the motion aligns with their locations on the default selection. In the case of motion sensors that have active zones such as cameras, IR sensors, sonic sensors, or other sensors capable of detecting motion within an active zone and creating an output representing that motion to a processing unit that is capable of determining direction, speed and/or acceleration properties of the sensed or detected motion, the selection object is generally virtual and motion of one or more body parts of a user is used to attract a selectable object or a group of selectable objects to the location of the selection object and predictive software is used to narrow the group of selectable objects and zero in on a particular selectable object, objects, objects and attributes, and/or attributes. In certain embodiments, the interface is activated from a sleep condition by movement of a user or user body part in to the active zone of the motion sensor or sensors associated with the interface. Once activated, the feedback unit such as a display associated with the interface displays or evidences in a user discernible manner a default set of selectable objects or a top level set of selectable objects. The selectable objects may be clustered in related groups of similar objects or evenly distributed about a centroid of attraction if no selection object is generated on the display or in or on another type of feedback unit. If one motion sensor is sensitive to eye motion, then motion of the eyes will be used to attract and discriminate between potential target objects on the feedback unit such as a display screen. If the interface is an eye only interface, then eye motion is used to attract and discriminate selectable objects to the centroid, with selection and activation occurring when a selection threshold is exceeded greater than 50% confidence that one selectable object is more closely aligned with the direction of motion than all other objects. The speed and/or acceleration of the motion along with the direction are further used to enhance discrimination by pulling potential target objects toward the centroid quicker and increasing their size and/or increasing their relative separation. Proximity to the selectable object may also be used to confirm the selection. Alternatively, if the interface is an eye and other body part interface, then eye motion will act as the primary motion driver, with motion of the other body part acting as a confirmation of eye movement selections. Thus, if eye motion has narrowed the selectable objects to a group, which may or may not dynamically change the perspective of the user (zoom in/out, pan, tilt, roll, or any combination of changes) motion of the other body part may be used by the processing unit to further discriminate and/or select/activate a particular object or if a particular object meets the threshold and is merging with the centroid, then motion of the object body part may be used to confirm or reject the selection regardless of the threshold confidence. In other embodiments, the motion sensor and processing unit may have a set of predetermined actions that are invoked by a given structure of a body part or a given combined motion of two or more body parts. For example, upon activation, if the motion sensor is capable of analyzing images, a hand holding up different number of figures from zero, a fist, to five, an open hand may cause the processing unit to display different base menus. For example, a fist may cause the processing unit to display the top level menu, while a single finger may cause the processing unit to display a particular submenu. Once a particular set of selectable objects is displayed, then motion attracts the target object, which is simultaneously selected and activated. In other embodiments, confirmation may include a noised generated by the uses such as a word, a vocal noise, a predefined vocal noise, a clap, a snap, or other audio controlled sound generated by the user; in other embodiments, confirmation may be visual, audio or haptic effects or a combination of such effects. In certain embodiments, the confirmation may be dynamic, a variable sound, color, shape, feel, temperature, distortion, or any other effect or combination of thereof.

Embodiments of this invention provide methods and systems implementing the methods comprising the steps of sensing circular movement via a motion sensor, where the circular movement is sufficient to activate a scroll wheel, scrolling through a list associated with the scroll wheel, where movement close to the center causes a faster scroll, while movement further from the center causes a slower scroll and simultaneously faster circular movement causes a faster scroll while slower circular movement causes slower scroll. When the user stops the circular motion, even for a very brief time, or changes direction such that it can be discerned to be no longer circular (such as moving in a Z-axis when the circular motion is in an X/Y plane) the list becomes static so that the user may move to a particular object, hold over a particular object, or change motion direction at or near a particular object. The whole wheel or a partial amount or portion of the wheel may be displayed or just an arc may be displayed where scrolling moves up and down the arc. These actions cause the processing unit to select the particular object, to simultaneously select and activate the particular object, or to simultaneously select, activate, and control an attribute of the object. By beginning the circular motion again, anywhere on the screen, scrolling recommences immediately. Of course, scrolling could be through a list of values, or actually be controlling values as well, and all motions may be in 2D or 3D environments as well.

Embodiments of the present invention also provide methods and systems implementing the methods including the steps of displaying an arcuate menu layouts of selectable objects on a display field, sensing movement toward an object pulling the object toward the user's location, user's movement, or center based on a direction, a speed and/or an acceleration of the movement, as the selected object moves toward user or the center, displaying subobjects appear distributed in an arcuate spaced apart configuration about the selected object. The apparatus, system and methods can repeat the sensing and displaying operations. In all cases, singular or multiple subobjects or submenus may be displayed between the user and the primary object, behind, below, or anywhere else as desired for the interaction effect.

Embodiments of this invention relate to methods and systems for implementing the methods comprising the steps of predicting an object's selection based on the properties of the sensed movement, where the properties includes direction, speed, acceleration, changes thereof, or combinations thereof. For example, faster speed may increase predictability, while slower speed may decrease predictability or vice versa. Alternatively, moving averages may be used to extrapolate the desired object desired such as vector averages, linear and non-linear functions, including filters and multiple outputs form one or more sensors. Along with this is the "gravitational", "electric" and/or "magnetic" attractive or repulsive effects utilized by the methods and systems, whereby the selectable objects move towards the user or selection object and accelerates towards the user or selection object as the user or selection object and selectable objects come closer together. This may also occur by the user beginning motion towards a particular selectable object, the particular selectable object begins to accelerate towards the user or the selection object, and the user and the selection object stops moving, but the particular selectable object continues to accelerate towards the user or selection object. In the certain embodiments, the opposite effect occurs as the user or selection objects moves away starting close to each other, the particular selectable object moves away quickly, but slows down its rate of repulsion as distance is increased, making a very smooth look. In different uses, the particular selectable object might accelerate away or return immediately to its original or predetermined position. In any of these circumstances, a dynamic interaction is occurring between the user or selection object and the particular selectable object(s), where selecting and controlling, and deselecting and controlling can occur, including selecting and controlling or deselecting and controlling associated submenus or subobjects and/or associated attributes, adjustable or invocable.

Embodiments of this invention relate to methods and systems for implementing the methods comprising the steps of detecting at least one bio-kinetic characteristic of a user such as a fingerprint, fingerprints, a palm print, retinal print, size, shape, and texture of fingers, palm, eye(s), hand(s), face, etc. or at least one EMF, acoustic, thermal or optical characteristic detectable by sonic sensors, thermal sensors, optical sensors, capacitive sensors, resistive sensors, or other sensor capable of detecting EMF fields, other dynamic wave form, or other characteristics, or combinations thereof emanating from a user, including specific movements and measurements of movements of body parts such as fingers or eyes that provide unique markers for each individual, determining an identity of the user from the bio-kinetic characteristics, and sensing movement as set forth herein. In this way, the existing sensor for motion may also recognize the user uniquely, as well as the motion event associated with the user. This recognition may be further enhanced by using two or more body parts or bio-kinetic characteristics (e.g., two fingers), and even further by body parts performing a particular task such as being squeezed together, when the user enters in a sensor field. Other bio-kinetic and/or biometric characteristics may also be used for unique user identification such as skin characteristics and ratio to joint length and spacing. Further examples include the relationship between the finger(s), hands or other body parts and the wave, acoustic, magnetic, EMF, or other interference pattern created by the body parts creates a unique constant and may be used as a unique digital signature. For instance, a finger in a 3D acoustic or EMF field would create unique null and peak points or a unique null and peak pattern, so the "noise" of interacting with a field may actually help to create unique identifiers. This may be further discriminated by moving a certain distance, where the motion may be uniquely identified by small tremors, variations, or the like, further magnified by interference patterns in the noise. This type of unique identification maybe used in touch and touchless applications, but may be most apparent when using a touchless sensor or an array of touchless sensors, where interference patterns (for example using acoustic sensors) may be present due to the size and shape of the hands or fingers, or the like. Further uniqueness may be determined by including motion as another unique variable, which may help in security verification. Furthermore, by establishing a base user's bio-kinetic signature or authorization, slight variations per bio-kinetic transaction or event may be used to uniquely identify each event as well, so a user would be positively and uniquely identified to authorize a merchant transaction, but the unique speed, angles, and variations, even at a wave form and/or wave form noise level could be used to uniquely identify one transaction as compared to another.

Embodiments of this invention relate to methods and systems for implementing the methods comprising the steps of sensing movement of a first body part such as an eye, etc., tracking the first body part movement until is stops, pauses or holds on an object, preliminarily selecting the object, sensing movement of a second body part such as finger, hand, foot, etc., confirming the preliminary selection and selecting the object. The selection may then cause the processing unit to invoke one of the command and control functions including issuing a scroll function, a simultaneous select and scroll function, a simultaneous select and activate function, a simultaneous select, activate, and attribute adjustment function, or a combination thereof, and controlling attributes by further movement of the first or second body parts or activating the objects if the object is subject to direct activation. These selection procedures may be expanded to the eye moving to an object (scrolling through a list or over a list), the finger or hand moving in a direction to confirm the selection and selecting an object or a group of objects or an attribute or a group of attributes. In certain embodiments, if object configuration is predetermined such that an object in the middle of several objects, then the eye may move somewhere else, but hand motion continues to scroll or control attributes or combinations thereof, independent of the eyes. Hand and eyes may work together or independently, or a combination in and out of the two. Thus, movements may be compound, sequential, simultaneous, partially compound, compound in part, or combinations thereof.

Embodiments of this invention relate to methods and systems for implementing the methods comprising the steps of capturing a movement of a user during a selection procedure or a plurality of selection procedures to produce a raw movement dataset. The methods and systems also include the step of reducing the raw movement dataset to produce a refined movement dataset, where the refinement may include reducing the movement to a plurality of linked vectors, to a fit curve, to a spline fit curve, to any other curve fitting format having reduced storage size, a reduced data point collection, or to any other fitting format. The methods and systems also include the step of storing the raw movement dataset or the refined movement dataset. The methods and systems also include the step of analyzing the refined movement dataset to produce a predictive tool for improving the prediction of a user's selection procedure using the motion based system or to produce a forensic tool for identifying the past behavior of the user or to process a training tools for training the user interface to improve user interaction with the interface.

Embodiments of this invention relate to methods and systems for implementing the methods comprising the steps of sensing movement of a plurality of body parts simultaneously or substantially simultaneously and converting the sensed movement into control functions for simultaneously controlling an object or a plurality of objects. The methods and systems also include controlling an attribute or a plurality of attributes, or activating an object or a plurality of objects, or any combination thereof. For example, placing a hand on a top of a domed surface for controlling a UAV, sensing movement of the hand on the dome, where a direction of movement correlates with a direction of flight, sensing changes in the movement on the top of the domed surface, where the changes correlate with changes in direction, speed, or acceleration of functions, and simultaneously sensing movement of one or more fingers, where movement of the fingers may control other features of the UAV such as pitch, yaw, roll, camera focusing, missile firing, etc. with an independent finger(s) movement, while the hand, palm or other designated area of the hand is controlling the UAV, either through remaining stationary (continuing last known command) or while the hand is moving, accelerating, or changing direction of acceleration. In certain embodiments where the display device is flexible device such as a flexible screen or flexible dome, the movement may also include deforming the surface of the flexible device, changing a pressure on the surface, inside the volume of the dome, or similar surface and/or volumetric deformations. These deformations may be used in conjunction with the other motions.

Embodiments of this invention relate to methods and systems for implementing the methods comprising the steps of populating a display field with displayed primary objects and hidden secondary objects, where the primary objects include menus, programs, applications, attributes, devices, etc. and secondary objects include submenus, attributes, preferences, etc. The methods and systems also include sensing movement, highlighting one or more primary objects most closely aligned with a direction of the movement, predicting a primary object based on the movement, and simultaneously: (a) selecting the primary object, (b) displaying secondary objects most closely aligned with the direction of motion in a spaced apart configuration, (c) pulling the primary and secondary objects toward a center of the display field or to a pre-determined area of the display field, and/or (d) removing, fading, or making inactive the unselected primary and secondary objects until making active again.

Alternately, zones in between primary and/or secondary objects may act as activating areas or subroutines that would act the same as the objects. For instance, if someone were to move in between two objects in 2D (a watch or mobile device), 3D space (virtual reality environments and altered reality environments), objects in the background could be rotated to the front and the front objects could be rotated towards the back, or to a different level.

Embodiments of this invention relate to methods and systems for implementing the methods comprising the steps of populating a display field with displayed primary objects and offset active fields associated with the displayed primary objects, where the primary objects include menus, object lists, alphabetic characters, numeric characters, symbol characters, other text based characters. The methods and systems also include sensing movement, highlighting one or more primary objects most closely aligned with a direction of the movement, predicting a primary object based on the movement, context, and/or movement and context, and simultaneously: (a) selecting the primary object, (b) displaying secondary (tertiary or deeper) objects most closely aligned with the direction of motion in a spaced apart configuration, (c) pulling the primary and secondary or deeper objects toward a center of the display field or to a pre-determined area of the display field, and/or (d) removing, making inactive, or fading or otherwise indicating non-selection status of the unselected primary, secondary, and deeper level objects.

Embodiments of this invention relate to methods and systems for implementing the methods comprising the steps of sensing movement of an eye and simultaneously moving elements of a list within a fixed window or viewing pane of a display field or a display or an active object hidden or visible through elements arranged in a 2D or 3D matrix within the display field, where eye movement anywhere, in any direction in a display field regardless of the arrangement of elements such as icons moves through the set of selectable objects. Of course the window may be moved with the movement of the eye to accomplish the same scrolling through a set of lists or objects, or a different result may occur by the use of both eye position in relation to a display or volume (perspective), as other motions occur, simultaneously or sequentially. Thus, scrolling does not have to be in a linear fashion, the intent is to select an object and/or attribute and/or other selectable items regardless of the manner of motion linear, arcuate, angular, circular, spiral, random, or the like. Once an object of interest is to be selected, then selection is accomplished either by movement of the eye in a different direction, holding the eye in place for a period of time over an object, movement of a different body part, or any other movement or movement type that affects the selection of an object, attribute, audio event, facial posture, and/or biometric or bio-kinetic event. These same steps may be used with body only or a combination of multiple body parts and eye or head gaze or movement.

Embodiments of this invention relate to methods and systems for implementing the methods comprising the steps of sensing movement of an eye, selecting an object, an object attribute or both by moving the eye in a pre-described change of direction such that the change of direction would be known and be different than a random eye movement, or a movement associated with the scroll (scroll being defined by moving the eye all over the screen or volume of objects with the intent to choose). Of course the eye may be replaced by any body part or object under the control of a body part.

Embodiments of this invention relate to methods and systems for implementing the methods comprising the steps of sensing eye movement via a motion sensor, selecting an object displayed in a display field when the eye pauses at an object for a dwell time sufficient for the motion sensor to detect the pause and simultaneously activating the selected object, repeating the sensing and selecting until the object is either activatable or an attribute capable of direct control. In certain embodiments, the methods also comprise predicting the object to be selected from characteristics of the movement and/or characteristics of the manner in which the user moves. In other embodiments, eye tracking using gaze instead of motion for selection/control via eye focusing (dwell time or gaze time) on an object and a body motion (finger, hand, etc.) scrolls through an associated attribute list associated with the object, or selects a submenu associated with the object. Eye gaze selects a submenu object and body motion confirms selection (selection does not occur without body motion), so body motion actually affects object selection.

In other embodiments, eye tracking using motion for selection/control eye movement is used to select a first word in a sentence of a word document. Selection is confirmed by body motion of a finger (e.g., right finger) which holds the position. Eye movement is then tracked to the last word in the sentence and another finger (e.g., the left finger) confirms selection. Selected sentence is highlighted due to second motion defining the boundary of selection. The same effect may be had by moving the same finger towards the second eye position (the end of the sentence or word). Movement of one of the fingers towards the side of the monitor (movement is in different direction than the confirmation move) sends a command to delete the sentence. Alternatively, movement of eye to a different location, followed by both fingers moving generally towards that location results in the sentence being copied to the location at which the eyes stopped. This may also be used in combination with a gesture or with combinations of motions and gestures such as eye movement and other body movements concurrently multiple inputs at once such as UAV controls described below.

In other embodiments, looking at the center of picture or article and then moving one finger away from center of picture or center of body enlarges the picture or article (zoom in). Moving finger towards center of picture makes picture smaller (zoom out). What is important to understand here is that an eye gaze point, a direction of gaze, or a motion of the eye provides a reference point for body motion and location to be compared. For instance, moving a body part (say a finger) a certain distance away from the center of a picture in a touch or touchless, 2D or 3D environment (area or volume as well), may provide a different view. For example, if the eye(s) were looking at a central point in an area, one view would appear, while if the eye(s) were looking at an edge point in an area, a different view would appear. The relative distance of the motion would change, and the relative direction may change as well, and even a dynamic change involving both eye(s) and finger, could provide yet another change of motion. For example, by looking at the end of a stick and using the finger to move the other end of it, the pivot point would be the end the eyes were looking at. By looking at the middle of the stick, then using the finger to rotate the end, the stick would pivot around the middle. Each of these movement may be used to control different attributes of a picture, screen, display, window, or volume of a 3D projection, etc. What now takes two fingers may be replaced by one due to the eye(s) acting as the missing finger.

These concepts are useable to manipulate the view of pictures, images, 3D data or higher dimensional data, 3D renderings, 3D building renderings, 3D plant and facility renderings, or any other type of 3D or higher dimensional pictures, images, or renderings. These manipulations of displays, pictures, screens, etc. may also be performed without the coincidental use of the eye, but rather by using the motion of a finger or object under the control or a user, such as by moving from one lower corner of a bezel, screen, or frame (virtual or real) diagonally to the opposite upper corner to control one attribute, such as zooming in, while moving from one upper corner diagonally to the other lower corner would perform a different function, for example zooming out. This motion may be performed as a gesture, where the attribute change might occur in at predefined levels, or may be controlled variably so the zoom in/out function may be a function of time, space, and/or distance. By moving from one side or edge to another, the same predefined level of change, or variable change may occur on the display, picture, frame, or the like. For example, a TV screen displaying a picture and zoom-in may be performed by moving from a bottom left corner of the frame or bezel, or an identifiable region (even off the screen) to an upper right potion. As the user moves, the picture is magnified (zoom-in). By starting in an upper right corner and moving toward a lower left, the system causes the picture to be reduced in size (zoom-out) in a relational manner to the distance or speed the user moves. If the user makes a quick diagonally downward movement from one upper corner to the other lower corner, the picture may be reduced by 50% (for example). This eliminates the need for using two fingers that is currently popular as a pinch/zoom function.

By the user moving from a right side of the frame or bezel or predefined location towards a left side, an aspect ratio of the picture may be changed so as to make the picture tall and skinny By moving from a top edge toward a bottom edge, the picture may cause the picture to appear short and wide. By moving two fingers from one upper corner diagonally towards a lower corner, or from side to side, a "cropping" function may be used to select certain aspects of the picture.

By taking one finger and placing it near the edge of a picture, frame, or bezel, but not so near as to be identified as desiring to use a size or crop control, and moving in a rotational or circular direction, the picture could be rotated variably, or if done in a quick gestural motion, the picture might rotate a predefined amount, for instance 90 degrees left or right, depending on the direction of the motion.

By moving within a central area of a picture, the picture may be moved "panned" variably by a desired amount or panned a preset amount, say 50% of the frame, by making a gestural motion in the direction of desired panning. Likewise, these same motions may be used in a 3D environment for simple manipulation of object attributes. These are not specific motions using predefined pivot points as is currently used in CAD programs, but is rather a way of using the body (eyes or fingers for example) in broad areas. These same motions may be applied to any display, projected display or other similar device. In a mobile device, where many icons (objects) exist on one screen, where the icons include folders of "nested" objects, by moving from one lower corner of the device or screen diagonally toward an upper corner, the display may zoom in, meaning the objects would appear magnified, but fewer would be displayed. By moving from an upper right corner diagonally downward, the icons would become smaller, and more could be seen on the same display. Moving in a circular motion near an edge of the display may cause rotation of the icons, providing scrolling through lists and pages of icons. Moving from one edge to an opposite edge would change the aspect ratio of the displayed objects, making the screen of icons appear shorter and wider, or taller and skinny, based on the direction moved.

In other embodiments, looking at a menu object then moving a finger away from object or center of body opens up sub menus. If the object represents a software program such as excel, moving away opens up spreadsheet fully or variably depending on how much movement is made (expanding spreadsheet window).

In other embodiments, instead of being a program accessed through an icon, the program may occupy part of a 3D space that the user interacts with or a field coupled to the program acting as a sensor for the program through which the user to interacts with the program. In other embodiments, if object represents a software program such as Excel and several (say 4) spreadsheets are open at once, movement away from the object shows 4 spread sheet icons. The effect is much like pulling curtain away from a window to reveal the software programs that are opened. The software programs might be represented as "dynamic fields", each program with its own color, say red for excel, blue for word, etc. The objects or aspects or attributes of each field may be manipulated by using motion. For instance, if a center of the field is considered to be an origin of a volumetric space about the objects or value, moving at an exterior of the field cause a compound effect on the volume as a whole due to having a greater x value, a greater y value, or a great z value say the maximum value of the field is 5 (x, y, or z), moving at a 5 point would be a multiplier effect of 5 compared to moving at a value of 1 (x, y, or z). The inverse may also be used, where moving at a greater distance from the origin may provide less of an effect on part or the whole of the field and corresponding values. Changes in color, shape, size, density, audio characteristics, or any combination of these and other forms of representation of values could occur, which may also help the user or users to understand the effects of motion on the fields. These may be preview panes of the spreadsheets or any other icons representing these. Moving back through each icon or moving the finger through each icon or preview pane, then moving away from the icon or center of the body selects the open programs and expands them equally on the desktop, or layers them on top of each other, etc. These actions may be combined, i.e. in AR/VR environments, where motion of the eyes and finger and another hand (or body) can each or in combination have a predetermined axis or axes to display menus and control attributes or choices that may be stationary or dynamic, and may interact with each other, so different combinations of eye, body and hand may provide the same results (redundantly), or different results based on the combination or sequence of motions and holds, gazes, and even pose or posture in combination with these. Thus, motion in multiple axes may move in compound ways to provide redundant or different effects, selection and attribute controls.

In other embodiments, four Word Documents (or any program or web pages) are open at once. Movement from bottom right of the screen to top left reveals the document at bottom right of page, effect looks like pulling curtain back. Moving from top right to bottom left reveals a different document. Moving from across the top, and circling back across the bottom opens all, each in its quadrant, then moving through the desired documents and creating circle through the objects links them all together and merges the documents into one document. As another example, the user opens three spreadsheets and dynamically combines or separates the spreadsheets merely via motions or movements, variably per amount and direction of the motion or movement. Again, the software or virtual objects are dynamic fields, where moving in one area of the field may have a different result than moving in another area, and the combining or moving through the fields causes a combining of the software programs, and may be done dynamically. Furthermore, using the eyes to help identify specific points in the fields (2D or 3D) would aid in defining the appropriate layer or area of the software program (field) to be manipulated or interacted with. Dynamic layers within these fields may be represented and interacted with spatially in this manner. Some or all the objects may be affected proportionately or in some manner by the movement of one or more other objects in or near the field. Of course, the eyes may work in the same manner as a body part or in combination with other objects or body parts. In all cases, contextual, environmental, prioritized, and weighted averages or densities and probabilities my affect the interaction and aspect view of the field and the data or objects associated with the field(s). For instance, creating a graphic representation of values and data points containing RNA, DNA, family historical data, food consumption, exercise, etc., would interact differently if the user began interacting closer to the RNA zone than to the food consumption zone, and the filed would react differently in part or throughout as the user moved some elements closer to others or in a different sequence from one are to another. This dynamic interaction and visualization would be expressive of weighted values or combinations of elements to reveal different outcomes.

In other embodiments, the eye selects (acts like a cursor hovering over an object and object may or may not respond, such as changing color to identify it has been selected), then a motion or gesture of eye or a different body part confirms and disengages the eyes for further processing.

In other embodiments, the eye selects or tracks and a motion or movement or gesture of second body part causes a change in an attribute of the tracked object such as popping or destroying the object, zooming, changing the color of the object, etc. finger is still in control of the object.

In other embodiments, eye selects, and when body motion and eye motion are used, working simultaneously or sequentially, a different result occurs compared to when eye motion is independent of body motion, e.g., eye(s) tracks a bubble, finger moves to zoom, movement of the finger selects the bubble and now eye movement will rotate the bubble based upon the point of gaze or change an attribute of the bubble, or the eye may gaze and select and/or control a different object while the finger continues selection and/or control of the first objector a sequential combination could occur, such as first pointing with the finger, then gazing at a section of the bubble may produce a different result than looking first and then moving a finger; again a further difference may occur by using eyes, then a finger, then two fingers than would occur by using the same body parts in a different order.

Other embodiments of this invention relate to methods and systems for implementing the methods comprising the steps of: controlling helicopter with one hand on a domed interface, where several fingers and hand all move together and move separately. In this way, the whole movement of the hand controls the movement of the helicopter in yaw, pitch and roll, while the fingers may also move simultaneously to control cameras, artillery, or other controls or attributes, or both. This is movement of multiple inputs simultaneously congruently or independently.

In certain embodiments, the perspective of the user as gravitational effects and object selections are made in 3D space. For instance, as we move in 3D space towards subobjects, using our previously submitted gravitational and predictive effects, each selection may change the entire perspective of the user so the next choices are in the center of view or in the best perspective. This may include rotational aspects of perspective, the goal being to keep the required movement of the user small and as centered as possible in the interface real estate. This is really showing the aspect, viewpoint or perspective of the user, and is relative. Since we are saying the objects and fields may be moved, or saying the user may move around the field, it is really a relative.

Other embodiments of this invention relate to methods and systems for implementing the methods comprising the steps of sensing movement of a button or knob with motion controls associated therewith, either on top of or in 3D, 3 space, on sides (whatever the shape), predicting which gestures are called by direction and speed of motion (maybe amendment to gravitational/predictive application). By definition, a gesture has a pose-movement-pose then lookup table, then command if values equal values in lookup table. We can start with a pose, and predict the gesture by beginning to move in the direction of the final pose. As we continue to move, we would be scrolling through a list of predicted gestures until we can find the most probable desired gesture, causing the command of the gesture to be triggered before the gesture is completed. Predicted gestures could be dynamically shown in a list of choices and represented by objects or text or colors or by some other means in a display. As we continue to move, predicted end results of gestures would be dynamically displayed and located in such a place that once the correct one appears, movement towards that object, representing the correct gesture, would select and activate the gestural command. In this way, a gesture could be predicted and executed before the totality of the gesture is completed, increasing speed and providing more variables for the user.

For example, in a keyboard application, current software use shapes of gestures to predict words. Google uses zones of letters (a group of letters), and combinations of zones (gestures) to predict words. We would use the same gesture-based system, except we be able to predict which zone the user is moving towards based upon direction of motion, meaning we would not have to actually move into the zone to finish the gesture, but moving towards the zone would select or bring up choice bubbles, and moving towards the bubble would select that bubble. Once a word is chose, a menu of expanding option could show, so one could create a sentence by moving through a sentence "tree".

In another example, instead of using a gesture such as "a pinch" gesture to select something in a touchless environment, movement towards making that gesture would actually trigger the same command. So instead of having to actually touch the finger to the thumb, just moving the finger towards the thumb would cause the same effect to occur. Most helpful in combination gestures where a finger pointing gesture is followed by a pinching gesture to then move a virtual object. By predicting the gesture, after the point gesture, the beginning movement of the pinch gesture would be faster than having to finalize the pinching motion.

Other embodiments of this invention relate to methods and systems for implementing the methods comprising the steps of: sensing movement via a motion sensor within a display field displaying a list of letters from an alphabet, predicting a letter or a group of letters based on the motion, if movement is aligned with a single letter, simultaneously select the letter or simultaneously moving the group of letter forward until a discrimination between letters in the group is predictively certain and simultaneously select the letter, sensing a change in a direction of motion, predicting a second letter or a second group of letter based on the motion, if movement is aligned with a single letter, simultaneously select the letter or simultaneously moving the group of letter forward until a discrimination between letters in the group is predictively certain and simultaneously select the letter, either after the first letter selection or the second letter selection or both, display a list of potential words beginning with either the first letter or the second letter, selecting a word from the word list by movement of a second body part simultaneously selected the word and resetting the original letter display, and repeating the steps until a message is completed.

Thus, the current design selects a letter simply by changing a direction of movement at or near a letter. A faster process would be to use movement toward a letter, then changing a direction of movement before reaching the letter and moving towards a next letter and changing direction of movement again before getting to the next letter would better predict words, and might change the first letter selection. Selection bubbles would appear and be changing while moving, so speed and direction would be used to predict the word, not necessarily having to move over the exact letter or very close to it, though moving over the exact letter would be a positive selection of that letter and this effect could be better verified by a slight pausing or slowing down of movement. (Of course, this could be combined with current button like actions or lift-off events (touch-up events), and more than one finger or hand may be used, both simultaneously or sequentially to provide the spelling and typing actions.) This is most effective in a touchless environment where relative motion can be leveraged to predict words on a keyboard rather than the actual distance required to move from key to key. The distance from a projected keyboard and movement of finger uses angles of motion to predict letters. Predictive word bubbles can be selected with a Z movement. B) Move below the letters of a keyboard to select, or shape the letter buttons in such a way that they extend downward (like a tear drop) so actual letters can be seen while selecting instead of covering the letters (the touch or active zones are offset from the actual keys. This can also be used with predictive motions to create a very fast keyboard where relative motions are used to predict keys and words while more easily being able to see the key letters. Bubbles could also appear above or besides the keys, or around them, including in an arcuate or radial fashion to further select predicted results by moving towards the suggested words.

Other embodiments of this invention relate to methods and systems for implementing the methods comprising the steps of: maintaining all software applications in an instant on configuration on, but inactive, resident, but not active, so that once selected the application which is merely dormant, is fully activate instantaneously (or may be described as a different focus of the object), sensing movement via a motion sensor with a display field including application objects distributed on the display in a spaced apart configuration, preferably, in a maximally spaced apart configuration so that the movement results in a fast predict selection of an application object, pulling an application object or a group of application objects toward a center of the display field, if movement is aligned with a single application, simultaneously select and instant on the application, or continue monitoring the movement until a discrimination between application objects is predictively certain and simultaneously selecting and activating the application object.

Thus, the industry must begin to start looking at everything as always on and what is on is always interactive, and may have different levels of interactivity. For instance, software should be an interactive field. Excel and word should be interactive fields where motion through them can combine or select areas, which correspond to cells and texts being intertwined with the motion. Excel sheets should be part of the same 3D field, not separate pages, and should have depth so their aspects can be combined in volume. The software desktop experience needs a depth where the desktop is the cover of a volume, and rolling back the desktop from different corners reveals different programs that are active and have different colors, such as word being revealed when moving from bottom right to top left and being a blue field, excel being revealed when moving from top left to bottom right and being red; moving right to left lifts desktop cover and reveals all applications in volume, each application with its own field and color in 3D space.

Other embodiments of this invention relate to methods and systems of this invention, where the active screen area includes a delete or backspace region. When the user moves the active object (cursor) toward the delete or backspace region, then the selected objects will be released one at a time or in groups or completely depending on attributes of movement toward the delete of backspace region. Thus, if the movement is slow and steady, then the selected objects are released one at a time. If the movement is fast, then multiple selected objects are released. Thus, the delete or backspace region is variable. For example, if the active display region represents a cell phone dialing pad (with the number distributed in any desired configuration from a traditional grid configuration to a arcuate configuration about the active object, or in any other desirable configuration), when by moving the active object toward the delete or backspace region, numbers will be removed from the number, which may be displayed in a number display region of the display. Alternatively, touching the backspace region would back up one letter; moving from right to left in the backspace region would delete (backspace) a corresponding amount of letters based on the distance (and/or speed) of the movement, The deletion could occur when the motion is stopped, paused, or a lift off event is detected. Alternatively, a swiping motion (jerk, or fast acceleration) could result in the deletion (backspace) the entire word. All these may or may not require a lift off event, but the motion dictates the amount deleted or released objects such as letters, numbers, or other types of objects. The same is true with the delete key, except the direction would be forward instead of backwards. Lastly, the same could be true in a radial menu (or linear or spatial), where the initial direction of motion towards an object or on an object, or in a zone associated with an object, that has a variable attribute. The motion associated with or towards that object would provide immediate control.

Other embodiments of this invention relate to methods and systems of this invention, where eye movement is used to select and body part movement is used to confirm or activate the selection. Thus, eye movement is used as the selective movement, while the object remains in the selected state, then the body part movement confirms the selection and activates the selected object. Thus, specifically stated the eye or eyes look in a different direction or area, and the last selected object would remain selected until a different object is selected by motion of the eyes or body, or until a time-out deselects the object. An object may be also selected by an eye gaze, and this selection would continue even when the eye or eyes are no longer looking at the object. The object would remain selected unless a different selectable object is looked at, or unless a timeout deselects the object occurs.

In all of the embodiments set forth above, the motion or movement may also comprise lift off events, where a finger or other body part or parts are in direct contract with a touch sensitive feedback device such as a touch screen, then the acceptable forms of motion or movement will comprise touching the screen, moving on or across the screen, lifting off from the screen (lift off events), holding still on the screen at a particular location, holding still after first contact, holding still after scroll commencement, holding still after attribute adjustment to continue an particular adjustment, holding still for different periods of time, moving fast or slow, moving fast or slow or different periods of time, accelerating or decelerating, accelerating or decelerating for different periods of time, changing direction, changing speed, changing velocity, changing acceleration, changing direction for different periods of time, changing speed for different periods of time, changing velocity for different periods of time, changing acceleration for different periods of time, or any combinations of these motions may be used by the systems and methods to invoke command and control over real world or virtual world controllable objects using on the motion only. Lift off or other events could "freeze" the state of menu, object or attribute selection, or combination of these, until another event occurs to move to a different event or state, or a time-out function resets the system or application to a preconfigured state or location. A virtual lift off could accomplish the same effect in a VR, AR or real environment, by moving in a different direction or designated direction with no physical lift off event. Of course, if certain objects that are invoked by the motion sensitive processing of the systems and methods of this invention require hard select protocols mouse clicks, finger touches, etc., the invoked object's internal function will not be augmented by the systems or methods of this invention unless the invoked object permits or supports system integration. In place of physical or virtual lift offs or confirmations could be sounds, colors or contextual or environmental triggers.

The systems and methods are disclosed herein where command functions for selection and/or control of real and/or virtual objects may be generated based on a change in velocity at constant direction, a change in direction at constant velocity, a change in both direction and velocity, a change in a rate of velocity, or a change in a rate of acceleration. Once detected by an detector or sensor, these changes may be used by a processing unit to issue commands for controlling real and/or virtual objects. A selection or combination scroll, selection, and attribute selection may occur upon the first movement. Such motion may be associated with doors opening and closing in any direction, golf swings, virtual or real world games, light moving ahead of a runner, but staying with a walker, or any other motion having compound properties such as direction, velocity, acceleration, and changes in any one or all of these primary properties; thus, direction, velocity, and acceleration may be considered primary motion properties, while changes in these primary properties may be considered secondary motion properties. The system may then be capable of differentially handling of primary and secondary motion properties. Thus, the primary properties may cause primary functions to be issued, while secondary properties may cause primary function to be issued, but may also cause the modification of primary function and/or secondary functions to be issued. For example, if a primary function comprises a predetermined selection format, the secondary motion properties may expand or contract the selection format.

In another example of this primary/secondary format for causing the system to generate command functions may involve an object display. Thus, by moving the object in a direction away from the user's eyes, the state of the display may change, such as from a graphic to a combination graphic and text, to a text display only, while moving side to side or moving a finger or eyes from side to side could scroll the displayed objects or change the font or graphic size, while moving the head to a different position in space might reveal or control attributes or submenus of the object. Thus, these changes in motions may be discrete, compounded, or include changes in velocity, acceleration and rates of these changes to provide different results for the user. These examples illustrate two concepts: 1) the ability to have compound motions which provide different results that the motions separately or sequentially, and (2) the ability to change states or attributes, such as graphics to text solely or in combination with single or compound motions, or with multiple inputs, such as verbal, touch, facial expressions, or bio-kinetically, all working together to give different results, or to provide the same results in different ways.

It must be recognized that the present invention while based on the use of sensed velocity, acceleration, and changes and rates of changes in these properties to effect control of real world objects and/or virtual objects, the present invention may also use other properties of the sensed motion in combination with sensed velocity, acceleration, and changes in these properties to effect control of real world and/or virtual objects, where the other properties include direction and change in direction of motion, where the motion has a constant velocity. For example, if the motion sensor(s) senses velocity, acceleration, changes in velocity, changes in acceleration, and/or combinations thereof that is used for primary control of the objects via motion of a primary sensed human, animal, part thereof, real world object under the control of a human or animal, or robots under control of the human or animal, then sensing motion of a second body part may be used to confirm primary selection protocols or may be used to fine tune the selected command and control function. Thus, if the selection is for a group of objects, then the secondary motion properties may be used to differentially control object attributes to achieve a desired final state of the objects.

For example, suppose the apparatuses of this invention control lighting in a building. There are banks of lights on or in all four walls (recessed or mounted) and on or in the ceiling (recessed or mounted). The user has already selected and activated lights from a selection menu using motion to activate the apparatus and motion to select and activate the lights from a list of selectable menu items such as sound system, lights, cameras, video system, etc. Now that lights has been selected from the menu, movement to the right would select and activate the lights on the right wall. Movement straight down would turn all of the lights of the right wall down dim the lights. Movement straight up would turn all of the lights on the right wall up brighten. The velocity of the movement down or up would control the rate that the lights were dimmed or brighten. Stopping movement would stop the adjustment or removing the body, body part or object under the user control within the motion sensing area would stop the adjustment.

For even more sophisticated control using motion properties, the user may move within the motion sensor active area to map out a downward concave arc, which would cause the lights on the right wall to dim proportionally to the arc distance from the lights. Thus, the right lights would be more dimmed in the center of the wall and less dimmed toward the ends of the wall.

Alternatively, if the movement was convex downward, then the light would dim with the center being dimmed the least and the ends the most. Concave up and convex up would cause differential brightening of the lights in accord with the nature of the curve.

Now, the apparatus may also use the velocity of the movement of the mapping out the concave or convex movement to further change the dimming or brightening of the lights. Using velocity, starting off slowly and increasing speed in a downward motion would cause the lights on the wall to be dimmed more as the motion moved down. Thus, the lights at one end of the wall would be dimmed less than the lights at the other end of the wall.

Now, suppose that the motion is a S-shape, then the light would be dimmed or brightened in a S-shaped configuration. Again, velocity may be used to change the amount of dimming or brightening in different lights simply by changing the velocity of movement. Thus, by slowing the movement, those lights would be dimmed or brightened less than when the movement is speed up. By changing the rate of velocity acceleration further refinements of the lighting configuration may be obtained.

Now suppose that all the lights in the room have been selected, then circular or spiral motion would permit the user to adjust all of the lights, with direction, velocity and acceleration properties being used to dim and/or brighten all the lights in accord with the movement relative to the lights in the room. For the ceiling lights, the circular motion may move up or down in the z direction to affect the luminosity of the ceiling lights. Thus, through the sensing of motion or movement within an active sensor zone area and especially volume, a user can use simple or complex motion to differentially control large numbers of devices simultaneously. By scrolling through the area (pointing the finger at each light) and stopping motion at each light desired it would be selected, then moving in a different direction would allow for attribute of only the selected lights. The same would hold for virtual objects in a 2D or 3D (VR/AR) environment. Thus, a user is able to select groups of objects that may represent real or virtual objects and once the group is selected, movement of the user may adjust all object and/or device attribute collectively. This feature is especially useful when the interface is associated with a large number of object, subobjects, and/or devices and the user wants to selected groups of these objects, subobjects, and/or devices so that they may be controlled collectively. Thus, the user may navigate through the objects, subobjects and/or devices and select any number of them by moving to each object pausing so that the system recognizes to add the object to the group. Once the group is defined, the user would be able to save the group as a predefined group or just leave it as a temporary group. Regardless, the group would not act as a single object for the remainder of the session. The group may be deselected by moving outside of the active field of sensor, sensors, and/or sensor arrays.

This differential control through the use of sensed complex motion permits a user to nearly instantaneously change lighting configurations, sound configurations, TV configurations, or any configuration of systems having a plurality of devices being simultaneously controlled or of a single system having a plurality of objects or attributes capable of simultaneous control. For examples, in a computer game including large numbers of virtual objects such as troops, tanks, airplanes, etc., sensed complex motion would permit the user to quickly deploy, redeploy, rearrangement, manipulated and generally quickly reconfigure all controllable objects and/or attributes by simply conforming the movement of the objects to the movement of the user sensed by the motion detector. This same differential device and/or object control would find utility in military and law enforcement, where command personnel by motion or movement within a sensing zone of a motion sensor quickly deploy, redeploy, rearrangement, manipulated and generally quickly reconfigure all assets to address a rapidly changing situation.

Embodiments of systems of this invention include a motion sensor or sensor array, where each sensor includes an active zone and where each sensor senses movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects and produces an output signal. The systems also include at least one processing unit including communication software and hardware, where the processing units convert the output signal or signals from the motion sensor or sensors into command and control functions, and one or a plurality of real objects and/or virtual objects in communication with the processing units. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. The processing unit or units (1) processes a scroll function or a plurality of scroll functions, (2) selects and processes a scroll function or a plurality of scroll functions, (3) selects and activates an object or a plurality of objects in communication with the processing unit, or (4) selects and activates an attribute or a plurality of attributes associated with an object or a plurality of objects in communication with the processing unit or units, or any combination thereof. The objects comprise electrical devices, electrical systems, sensors, hardware devices, hardware systems, environmental devices and systems, energy and energy distribution devices and systems, software systems, software programs, software objects, or combinations thereof. The attributes comprise adjustable attributes associated with the devices, systems, programs and/or objects. In certain embodiments, the sensor(s) is(are) capable of discerning a change in movement, velocity and/or acceleration of +5%. In other embodiments, the sensor(s) is(are) capable of discerning a change in movement, velocity and/or acceleration of +10°. In other embodiments, the system further comprising a remote control unit or remote control system in communication with the processing unit to provide remote control of the processing unit and all real and/or virtual objects under the control of the processing unit. In other embodiments, the motion sensor is selected from the group consisting of digital cameras, optical scanners, optical roller ball devices, touch pads, inductive pads, capacitive pads, holographic devices, laser tracking devices, thermal devices, touch or touchless sensors, acoustic devices, any other device capable of sensing motion, fields, waveforms, or changes thereof, arrays of such devices, and mixtures and combinations thereof. In other embodiments, the objects include environmental controls, lighting devices, cameras, ovens, dishwashers, stoves, sound systems, display systems, alarm systems, control systems, virtual reality systems, augmented reality systems, medical devices, robots, robotic control systems, virtual reality systems, augmented reality systems, hot and cold water supply devices, air conditioning systems, heating systems, ventilation systems, air handling systems, computers and computer systems, chemical or manufacturing plant control systems, computer operating systems and other software systems, remote control systems, mobile devices, electrical systems, sensors, hardware devices, hardware systems, environmental devices and systems, energy and energy distribution devices and systems, software programs or objects or mixtures and combinations thereof.

Embodiments of methods of this invention for controlling objects include the step of sensing movement, movement direction, movement velocity, and/or movement acceleration, and/or changes in movement direction, changes in movement velocity, and/or changes in movement acceleration, and/or changes in a rate of a change in direction, changes in a rate of a change in velocity and/or changes in a rate of a change in acceleration within the active zone by one or a plurality of body parts or objects within an active sensing zone of a motion sensor or within active sensing zones of an array of motion sensors. The methods also include the step of producing an output signal or a plurality of output signals from the sensor or sensors and converting the output signal or signals into a command function or a plurality of command functions. The command and control functions comprise at least (1) a scroll function or a plurality of scroll functions, (2) a select function or a plurality of select functions, (3) an attribute function or plurality of attribute functions, (4) an attribute control function or a plurality of attribute control functions, or (5) a simultaneous control function. The simultaneous control function includes (a) a select function or a plurality of select functions and a scroll function or a plurality of scroll functions, (b) a select function or a plurality of select functions and an activate function or a plurality of activate functions, and (c) a select function or a plurality of select functions and an attribute control function or a plurality of attribute control functions. In certain embodiments, the objects comprise electrical devices, electrical systems, sensors, hardware devices, hardware systems, environmental devices and systems, energy and energy distribution devices and systems, software systems, software programs, software objects, or combinations thereof. In other embodiments, the attributes comprise adjustable attributes associated with the devices, systems, programs and/or objects. In other embodiments, the timed hold is brief or the brief cessation of movement causing the attribute to be adjusted to a preset level, causing a selection to be made, causing a scroll function to be implemented, or a combination thereof. In other embodiments, the timed hold is continued causing the attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value or scroll function in a direction of the initial motion until the timed hold is removed. In other embodiments, the motion sensor is selected from the group consisting of sensors of any kind including digital cameras, optical scanners, optical roller ball devices, touch pads, inductive pads, capacitive pads, holographic devices, laser tracking devices, thermal devices, touch or touchless sensors, acoustic devices, and any other device capable of sensing motion or changes in any waveform due to motion or arrays of such devices, and mixtures and combinations thereof. In other embodiments, the objects include lighting devices, cameras, ovens, dishwashers, stoves, sound systems, display systems, alarm systems, virtual reality systems, augmented reality systems, control systems, virtual reality systems, augmented reality systems, medical devices, robots, robotic control systems, hot and cold water supply devices, air conditioning systems, heating systems, ventilation systems, air handling systems, computers and computer systems, chemical plant control systems, computer operating systems and other software systems, remote control systems, sensors, or mixtures and combinations thereof.

The all of these scenarios set forth above are designed to illustrate the control of a large number of devices using properties and/or characteristics of the sensed motion including, without limitation, relative distance of the motion for each object (real like a person in a room using his/her hand as the object for which motion is being sensed or virtual representations of the objects in a virtual or rendered room on a display apparatus), direction of motion, speed of motion, acceleration of motion, changes an any of these properties, rates of changes in any of these properties, or mixtures and combinations thereof to control a single controllable attribute of the object such as lights. However, the systems, apparatuses, and methods of this invention are also capable of using motion properties and/or characteristics to control two, three, or more attributes of an object. Additionally, the systems, apparatuses, and methods of this invention are also capable of using motion properties and/or characteristics from a plurality of moving objects within a motion sensing zone to control different attributes of a collection of objects. For example, if the lights in the above figures are capable of color as well as brighten, then the motion properties and/or characteristic may be used to simultaneously change color and intensity of the lights or one sensed motion could control intensity, while another sensed motion could control color. For example, if an artist wanted to paint a picture on a computer generated canvas, then motion properties and/or characteristic would allow the artist to control the pixel properties of each pixel on the display using the properties of the sensed motion from one, two, three, etc. sensed motions. Thus, the systems, apparatuses, and methods of this invention are capable of converting the motion properties associated with each and every object being controlled based on the instantaneous properties values as the motion traverse the object in real space or virtual space.

The systems, apparatuses and methods of this invention activate upon motion being sensed by one or more motion sensors. This sensed motion then activates the systems and apparatuses causing the systems and apparatuses to process the motion and its properties activating a selection object and a plurality of selectable objects. Once activated, the motion properties cause movement of the selection object accordingly, which will cause a pre-selected object or a group of pre-selected objects, to move toward the selection object, where the pre-selected object or the group of pre-selected objects are the selectable object(s) that are most closely aligned with the direction of motion, which may be evidenced by the user feedback units by corresponding motion of the selection object. Another aspect of the systems or apparatuses of this invention is that the faster the selection object moves toward the pre-selected object or the group of preselected objects, the faster the pre-selected object or the group of preselected objects move toward the selection object. Another aspect of the systems or apparatuses of this invention is that as the pre-selected object or the group of pre-selected objects move toward the selection object, the pre-selected object or the group of pre-selected objects may increase in size, change color, become highlighted, provide other forms of feedback, or a combination thereof. Another aspect of the systems or apparatuses of this invention is that movement away from the objects or groups of objects may result in the objects moving away at a greater or accelerated speed from the selection object(s). Another aspect of the systems or apparatuses of this invention is that as motion continues, the motion will start to discriminate between members of the group of pre-selected object(s) until the motion results in the selection of a single selectable object or a coupled group of selectable objects. Once the selection object and the target selectable object touch, active areas surrounding the objection touch, a threshold distance between the object is achieved, or a probability of selection exceeds an activation threshold, the target object is selected and non-selected display objects are removed from the display, change color or shape, or fade away or any such attribute so as to recognize them as not selected. The systems or apparatuses of this invention may center the selected object in a center of the user feedback unit or center the selected object at or near a location where the motion was first sensed. The selected object may be in a corner of a display—on the side the thumb is on when using a phone, and the next level menu is displayed slightly further away, from the selected object, possibly arcuately, so the next motion is close to the first, usually working the user back and forth in the general area of the center of the display. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like or anti-gravity like action on display objects. As the selection object(s) moves, it attracts an object or objects in alignment with the direction of the selection object's motion pulling those object(s) toward it and may simultaneously or sequentially repel non-selected items away or indicate non-selection in any other manner so as to discriminate between selected and non-selected objects As motion continues, the pull increases on the object most aligned with the direction of motion, further accelerating the object toward the selection object until they touch or merge or reach a threshold distance determined as an activation threshold. The touch or merge or threshold value being reached causes the processing unit to select and activate the object(s). Additionally, the sensed motion may be one or more motions detected by one or more movements within the active zones of the motion sensor(s) giving rise to multiple sensed motions and multiple command function that may be invoked simultaneously or sequentially. The sensors may be arrayed to form sensor arrays. If the object is an executable object such as taking a photo, turning on a device, etc, then the execution is simultaneous with selection. If the object is a submenu, sublist or list of attributes associated with the selected object, then the submenu members, sublist members or attributes are displayed on the screen in a spaced apart format. The same procedure used to select the selected object is then used to select a member of the submenu, sublist or attribute list. Thus, the interfaces have a gravity like action on display objects. As the selection object moves, it attracts an object or objects in alignment with the direction of the selection object's motion pulling those object toward it. As motion continues, the pull increases on the object most aligned with the direction of motion, further accelerating the object toward the selection object until they touch or merge or reach a threshold distance determined as an activation threshold to make a selection. The touch, merge or threshold event causes the processing unit to select and activate the object.

The sensed motion may result not only in activation of the systems or apparatuses of this invention, but may be result in select, attribute control, activation, actuation, scroll or combination thereof.

Different haptic (tactile) or audio or other feedback may be used to indicate different choices to the user, and these may be variable in intensity as motions are made. For example, if the user moving through radial zones different objects may produce different buzzes or sounds, and the intensity or pitch may change while moving in that zone to indicate whether the object is in front of or behind the user.

Compound motions may also be used so as to provide different control function than the motions made separately or sequentially. This includes combination attributes and changes of both state and attribute, such as tilting the device to see graphics, graphics and text or text, along with changing scale based on the state of the objects, while providing other controls simultaneously or independently, such as scrolling, zooming in/out, or selecting while changing state. These features may also be used to control chemicals being added to a vessel, while simultaneously controlling the amount. These features may also be used to change between Windows 8 and Windows 7 with a tilt while moving icons or scrolling through programs at the same time.

Audible or other communication medium may be used to confirm object selection or in conjunction with motion so as to provide desired commands (multimodal) or to provide the same control commands in different ways.

The present systems, apparatuses, and methods may also include artificial intelligence components that learn from user motion characteristics, environment characteristics (e.g., motion sensor types, processing unit types, or other environment properties), controllable object environment, etc. to improve or anticipate object selection responses.

Embodiments of this invention further relate to systems for selecting and activating virtual or real objects and their controllable attributes including at least one motion sensor having an active sensing zone, at least one processing unit, at least one power supply unit, and one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors sensor outputs, and/or the processing units.

In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the system further includes at least on user feedback unit, at least one battery backup unit, communication hardware and software, at least one remote control unit, or mixtures and combinations thereof, where the sensors, processing units, power supply units, the user feedback units, the battery backup units, the remote control units are in electrical communication with each other. In other embodiments, faster motion causes a faster movement of the target object or objects toward the selection object or causes a greater differentiation of the target object or object from the non-target object or objects. In other embodiments, if the activated objects or objects have subobjects and/or attributes associated therewith, then as the objects move toward the selection object, the subobjects and/or attributes appear and become more discernible as object selection becomes more certain. In other embodiments, once the target object or objects have been selected, then further motion within the active zones of the motion sensors causes selectable subobjects or selectable attributes aligned with the motion direction to move towards the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, virtual reality systems, augmented reality systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention further relates to methods for controlling objects include sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof and producing an output signal or a plurality of output signals corresponding to the sensed motion. The methods also include converting the output signal or signals via a processing unit in communication with the motion sensors into a command function or a plurality of command functions. The command functions include (1) a start function, (2) a scroll function, (3) a select function, (4) an attribute function, (5) an attribute control function, (6) a simultaneous control function including: (a) a select and scroll function, (b) a select, scroll and activate function, (c) a select, scroll, activate, and attribute control function, (d) a select and activate function, (e) a select and attribute control function, (f) a select, active, and attribute control function, or (g) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units.

In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, fields, waveforms, changes thereof, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods include sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In other embodiments, the methods include sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Dynamic Environments

The inventors have found that systems and methods implemented on a processing unit such as a computer may be constructed that permit the creation of dynamic environments for object and/or attribute display, manipulation, differentiation, and/or interaction, where the systems include one processing unit or a plurality of processing units, one motion sensor or a plurality of motion sensors, one user interface or a plurality of user interfaces and dynamic environment software for generating, displaying, and manipulating the dynamic environments and the objects and/or attributes included therein. The dynamic environments are produced via user interaction with the sensor(s), which are in electronic communication with the processing unit(s), and comprise a set of objects and associated attributes displayed on the user interface(s) so that the objects and/or attributes are differentiated one from the other. The differentiation may evidence priority, directionality, content, type, activation procedures, activation parameters, control features, other properties that are associated with the objects and/or attributes or combinations thereof. The differentiation and distribution of the objects and/or attributes may change based on user interaction with the motion sensors and/or locations of the motion sensors, where at least one motion sensor or sensor output is associated with a mobile or stationary device or where at least one motion sensor or sensor output is associated with a mobile device and at least one motion sensor or sensor output is associated with a stationary device, and mixtures or combinations thereof. Of course, these same procedures may be used with objects and/or attributes at any level of drill down.

In certain embodiments, the systems and methods of this invention activation of the system causes a plurality of selectable objects to be displayed on a display device of a user interface associated with the systems. The selectable objects may be represent: (1) objects that may directly invoked, (2) objects that have a single attribute, (3) objects that have a plurality of attributes, (4) objects that are lists or menus that may include sublists or submenus, (5) any other selectable item, or (6) mixtures and combinations thereof. The objects may represent virtual or real objects. Virtual objects may be any object that represents an internal software component. Real object may be executable programs or software application or may be real world devices that may be controlled by the systems and/or methods. The displayed selectable objects may be a default set of selectable objects, pre-defined set of selectable objects, or a dynamically generated set of selectable objects, generated based on locations of the sensors associated with mobile devices and the motion sensors associated with stationary devices. The systems and methods permit the selectable objects to interact with the user dynamically so that object motion within the environments better correlates with the user ability to interact with the objects. The user interactions include, but are not limited to: (a) object discrimination based on sensed motion, (b) object selection base on sensed motion, (c) menu drill down based on sensed motion, (d) menu drill up based on sensed motion, (e) object selection and activation based on sensed motion and on the nature of the selectable object, (f) scroll/selection/activation based on sensed motion and on the nature of the selectable object, and (g) any combination of the afore listed interactions associated with a collection of linked objects, where the linking may be pre-defined, based on user gained interaction knowledge, or dynamically generated based on the user, sensor locations, and the nature of the sensed motion. The systems and methods may also associate one or a plurality of object differentiation properties with the displayed selectable objects, where the nature of the differentiation for each object may be predefined, defined based on user gained interaction knowledge, or dynamically generated based on the user, sensor locations, and/or the nature of the sensed motion. The differentiation properties include, but are not limited to: color; color shading; spectral attributes associated with the shading; highlighting; flashing; rate of flashing; flickering; rate of flickering; shape; size; movement of the objects such as oscillation, side to side motion, up and down motion, in and out motion, circular motion, elliptical motion, zooming in and out, etc.; rate of motion; pulsating; rate of pulsating; visual texture; touch texture; sounds such as tones, squeals, beeps, chirps, music, etc.; changes of the sounds; rate of changes in the sounds; any user discernible object differentiation properties, or any mixture and combination thereof. The differentiation may signify to the user a sense of direction, object priority, object sensitivity, etc., all helpful to the user for dynamic differentiation of selectable objects displayed on the display derived from the user, sensed motion, and/or the location of the mobile and stationary sensors.

For example, one displayed object may pulsate (slight zooming in and out, or expanding and contracting) at a first rate, while another displayed object may pulsate a second rate, where the first and second rates may be the same or different, and a faster pulsation rate may be associated with a sense of urgency relative to objects having a slower rate of pulsation. These rates may change in a pre-defined manner, a manner based on knowledge of the user, or dynamically based on the user, sensor locations, and/or the nature of the sensed motion.

In another example, a set of objects may slightly move to the right faster than they move back to the left, indicating that the user should approach the objects from the right, instead from another direction.

In certain embodiments, a main object may have one or a plurality of sub-objects moving (constant or variable rate and/or direction) around or near the main object, indicating the nature of the sub-objects. In this case, sub-objects revolving around the main object may represent that they need to be interacted with in a dynamic, motion-based way, whereas the main object may be interacted with in a static manner such as a vocal command, hitting a button, clicking, or by any other non-dynamic or static interaction.

In other embodiments, a main object may have a certain color, such as blue, and its associated sub-objects have shades of blue, especially where the sub-objects dynamically transition from blue to off-blue or blue-green or other related colors, displaying they come from the primary blue object, whereas a red Object next to the blue one might have sub-objects that transition to orange, while a sub-object that transitions to purple might represent it is a sub-set of blue and red and can be accessed through either.

In other embodiments, the objects or sub-objects may fade in or out, representing changes of state based on a time period that the user interacts with them. By fading out, the systems may be notifying the user that the program or application (e.g., water flow in a building) will be entering a sleep or interruption state. The rate of the fade out may indicate how quickly the program or application transitions into a sleep state and how quickly they reactivate. A fade-in might relay the information that the object will automatically initiate over a given time automatically vs. manually.

In other embodiments, an array of objects, such as the screen of apps on a mobile device, the objects pulsing might represent programs that are active, whereas the objects that are static might represent programs that are inactive. Programs that are pulsing at a slower rate might represent programs running occasionally in the background. Of course, other dynamic indicators, such as changes in color, intensity, translucency, size, shape, or any recognizable attribute, may be used to relay information to the user.

Another example of the operation of the systems and methods of this invention may be in a medical context. In such a case, the objects displayed on the user interface may be an array of sensors active in an operating room including, but not limited to, oxygen sensors, blood flow sensors, pulse rate sensors, heart beat rate, blood pressure sensors, brain activity sensors, etc. The different dynamic changes in color, shape, size, sound, and/or movement of the objects may represent data associated with the sensors, providing multiple points of information in a simple, compounded way to the user. If color represented oxygen level, size represented pressure, and dynamic movement of the object represented heartbeat, one object could represent a great deal of information to the user.

The characteristics of associated sub-objects seen simultaneously (or sequentially after the primary objects are selected) could likewise provide much more information than just letting the user know more information exists in this case, the primary object would be labeled with the corresponding body position and the sub-object representing oxygen level past and current data might be pulsing or intensifying dynamically in color, while the blood pressure sub-object might be slightly growing larger or smaller with each heartbeat, representing minimal change in blood pressure, and the heartbeat might be represented by the object rotating CW, then CCW with each heartbeat.

In another example, one object (or word in a word document) swapping places with another might represent the need to change the word to provide better grammar for a sentence. Spelling changes might be represented by pulsing words, and words that are acceptable, but have a better common spelling might be represented by words that pulse at a slower rate. Dynamic changes of color might also be associated with the words or other characteristics to draw attention to the user and give secondary information at the same time, such as which words that might be too high or too low of a grade level for the reader in school books.

Thus, any combination of dynamic characteristics may be used to provide more information to the user than a static form of information, and may be used in conjunction with the static information characteristic.

In certain embodiments, objects (such as application icons) may have several possible states and display states. An object may be in an unselected state, a present state (available for selection but with no probability of being selected yet), a pre-selected (now probable, but not meeting a threshold criteria for being selected), a selected state (selected but not opened or having an execute command yet issued), or an actuated state (selected and having an attribute executed (i.e., on (vs. off), variable control ready to change based on moving up or down, or a submenu is displayed and ready to be selected). If the object is in a group of objects, as the user moves towards that group, the zone and/or the group of objects may display or present a different characteristic that represents they are ready to be selected; this may be identified as a pre-selected state. In each state, the objects may display different characteristics to convey information to the user, such as change of shape, size, color, sound, smell, feel, pulse rate, different dynamic directional animations, etc. For instance, before a user touches a mobile device (one with a touch sensor), the objects may be in an unselected state, displaying no attribute other than the common static display currently employed. Once a user touches the screen, the items that need attention might change in color (present, but no different probability of being selected than any others). As the user begins to move in the direction of an object desired, the more likely objects may begin to display differently, such as increasing in size, or begin pulsing, and as the probability increases, the pulse rate may increase, but objects in more urgent need of attention may pulse differently or even faster than others in the same group or zone pre-selected. Once the correct object(s) is selected, it may show and even different state, such as displaying subobjects, changing color, or making a sound, but it still may not be open or actuated yet. If the attribute is volume control, it may be selected, but would not control volume until it is actuated by moving up or down, adjusting the volume. Of course, objects in an unselected state may show dynamic characteristics (pulsing for example) as well to convey information to the user, such as activity or priority. In this way, it may have a dynamic characteristic while in a static state.

In another example, for apps in the corner of a mobile device, when, head or eye gaze is directed towards that zone or objects, they may be in an unselected, preselected, or selected but not actuated state, and they may demonstrate dynamic indicators/attributes to convey intent, attributes, sub-attributes, or mixed or combination content or attributes with changing environments. They may display differently at any state, or only at one particular state (such as selected), and this may be a preset value, or something dynamic, such as contextual or environmental factors. An example of this last dynamic characteristic indicator would be in a vehicle or virtual reality display where the song playlist would cause a pulsing effect on preferred songs, but different songs would pulse differently when another occupant or player enters the environment, indicating the suggested objects would change due a combination of user preferences, and the dynamic display characteristics of all or some of the objects would change to indicate a combination preferential selections).

The dynamic environment systems of this invention may also be used in virtual reality systems and/or augmented reality systems so that players or users of these virtual reality systems and/or augmented reality systems through motion and motion attributes are able to select, target, and/or deselect features, menus, objects, constructs, constructions, user attributes, weapons, personal attributes, personal features, any other selectable or user definable features or attributes of the virtual space or augmented reality space. Thus, as a user enters first enters a virtual reality space or augment reality space, all of the selectable or definable features and/or attributes of the space would be displayed about the user in any desired form 2D and/or 3D semicircular or hemispherical array with user at center, 2D and/or 3D circular or spherical array with user at center, 2D and/or 3D matrix array with user at center or off-center, any other 2D and/or 3D display of features and attributes, or mixtures and combinations thereof. As the user moves a body part associated with the motion detectors used to interface with the space (visual eye tracking sensors, hand part sensors gloves or the like, body sensors body suits, or other sensors), the sensed motions and motion attributes such as direction, speed, acceleration, and/or changes in any of these motion attributes cause features and/or attributes to display differently based on state and information to display to the user, and may move toward the user based on the motion and motion properties of the object and/or the user, while the other features and/or attributes stay static or move away from the user. An example of this is to move towards a particular tree in a group of trees in a game. As the user looks toward a particular tree, the tree might shake while the others sway gently, as the user moves toward the tree, the tree may begin to move towards the user at a faster rate, if has a special prize associated with it, or at a slower rate in no prize. If the special prize is a one of a kind attribute, the tree may change color or size at it moves towards the user and the user is moving towards the tree. Once the tree is selected via a threshold event, it may change shape into the prize it held, and then the start to act like that prize when it is selected by the user moving the hand towards a designated area of the object enough to actuate. These different attributes or characteristics are part of a dynamic environment where the speed, direction, state, display characteristics and attributes are affected by motion of the user and object, or any combination of these. In another example, where it is desired to choose one object, as the motion or motion attributes of user(s), object(s) or both continue, the features and/or attributes are further of user, objects or both are discriminated, and the target features and/or attributes may move closer. Once the target is fully differentiated, then all subfeatures and/or subobjects may become visible. As motion continues, features and/or attributes and/or subfeatures and/or subobjects are selected and the user gains the characteristics or features the user desires in the space. All of the displayed features and/or attributes and/or subfeatures and/or subobjects may also include highlighting features such as sound (chirping, beeping, singing, etc.), vibration, back and forth movement, up and down movement, circular movement, etc.

Motion Interfaces Using Different Data Types

Embodiments of this invention relate broadly to computing devices, comprising at least one sensor or sensor output configured to capture data including user data, motion data, environment data, temporal data, contextual data, or mixtures and combinations thereof. The computing device also includes at least one processing unit configured, based on the captured data, to generate at least one command function. The command functions comprise: (1) a single control function including (a) a start function, (b) a scroll function, (c) a select function, (d) an attribute function, (e) an activate function, or (f) mixtures and combinations thereof. The command functions also comprise: (2) a simultaneous control function including (a) a combination of two or more of the functions (1a-1e), (b) a combination of three or more of the functions (1a-1e), (c) a combination of four or more of the functions (1a-1e), (d) mixtures and combinations thereof. The command functions may also comprise (3) mixtures and combinations of any of the above functions. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, wave or waveform sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer implemented methods, comprising under the control of a processing unit configured with executable instructions, receiving data from at least one sensor configured to capture the data, where the captured data includes user data, motion data, environment data, temporal data, contextual data, or mixtures and combinations thereof. The methods also comprise processing the captured data to determine a type or types of the captured data; analyzing the type or types of the captured data; and invoking a control function corresponding to the analyzed data. The control functions comprise: (1) a single control function including: (a) a start function, (b) a scroll function, (c) a select function, (d) an attribute function, (e) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to non-transitory computer readable storage media storing one or more sequences of instructions that, when executed by one or more processing units, cause a computing system to: (a) receive data from at least one sensor configured to capture the data, where the captured data includes user data, motion data, environment data, temporal data, contextual data, or mixtures and combinations thereof; (b) process the captured data to determine a type or types of the captured data; (c) analyze the type or types of the captured data; and (d) invoke a control function corresponding to the analyzed data. The control functions comprise (1) a single control function including: (a) a start function, (b) a scroll function, (c) a select function, (d) an attribute function, (e) an activate function, or (f) mixtures and combinations thereof, or (2) a simultaneous control function including: (a) a combination of two or more of the functions (1a-1e), (b) a combination of three or more of the functions (1a-1e), (c) a combination of four or more of the functions (1a-1e), (d) mixtures and combinations thereof, or (3) mixtures and combinations thereof. In certain embodiments, the at least one sensor comprises touch pads, touchless pads, inductive sensors, capacitive sensors, optical sensors, acoustic sensors, thermal sensors, optoacoustic sensors, electromagnetic field (EMF) sensors, strain gauges, accelerometers, any other sensor that senses movement or changes in movement, or mixtures and combinations thereof. In other embodiments, a first control function is a single control function. In other embodiments, a first control function is a single control function and a second function is a simultaneous control function. In other embodiments, a first control function is a simultaneous control function. In other embodiments, a first control function is a simultaneous control function and a second function is a simultaneous control function. In other embodiments, a plurality of single and simultaneous control functions are actuated by user determined motion.

Embodiments of this invention relate broadly to computer-implemented systems comprising a digital processing device comprising at least one processor, an operating system configured to perform executable instructions, and a memory; a computer program including instructions executable by the digital processing device to create a gesture-based navigation environment. The environment comprises a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; in response to receipt of input data representing a navigational gesture of the user substantially perpendicular to the curvilinear orientation, an intended secondary menu item in line with the direction of the navigational gesture is scaled and moved opposite to the direction of the navigational gesture to facilitate user access. In certain embodiments, the processing device or unit is a smart watch and the motion sensor is a touchscreen display.

Embodiments of this invention relate broadly to non-transitory computer-readable storage media encoded with a computer program including instructions executable by a processor to create a gesture-based navigation environment comprising: a software module configured to receive input data from a motion sensor, the input data representing navigational gestures of a user; a software module configured to present one or more primary menu items; and a software module configured to present a plurality of secondary menu items in response to receipt of input data representing a navigational gesture of the user indicating selection of a primary menu item, the secondary menu items arranged in a curvilinear orientation about the selected primary menu item. The environment operates such that in response to receipt of input data representing a navigational gesture of the user comprising motion substantially parallel to the curvilinear orientation, the plurality of secondary menu items scrolls about the curvilinear orientation; and in response to receipt of input data representing a navigational gesture of the user substantially perpendicular to the curvilinear orientation, an intended secondary menu item in line with the direction of the navigational gesture is scaled and moved opposite to the direction of the navigational gesture to facilitate user access. In certain embodiments, the processor is a smart watch and the motion sensor is a touchscreen display.

Embodiments of this invention relate broadly to systems for selecting and activating virtual or real objects and their controllable attributes comprising: at least one motion sensor having an active sensing zone, at least one processing unit, at least one power supply unit, one object or a plurality of objects under the control of the processing units. The sensors, processing units, and power supply units are in electrical communication with each other. The motion sensors sense motion including motion properties within the active zones, generate at least one output signal, and send the output signals to the processing units. The processing units convert the output signals into at least one command function. The command functions comprise: (7) a start function, (8) a scroll function, (9) a select function, (10) an attribute function, (11) an attribute control function, (12) a simultaneous control function. The simultaneous control functions include: (g) a select and scroll function, (h) a select, scroll and activate function, (i) a select, scroll, activate, and attribute control function, (j) a select and activate function, (k) a select and attribute control function, (l) a select, active, and attribute control function, or (m) combinations thereof. The control functions may also include (13) combinations thereof. The start functions activate at least one selection or cursor object and a plurality of selectable objects upon first sensing motion by the motion sensors and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects. The motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects and mixtures or combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise selectable, activatable, executable and/or adjustable attributes associated with the objects. The changes in motion properties are changes discernible by the motion sensors and/or the processing units. In certain embodiments, the start functions further activate the user feedback units and the selection objects and the selectable objects are discernible via the motion sensors in response to movement of an animal, human, robot, robotic system, part or parts thereof, or combinations thereof within the motion sensor active zones. In other embodiments, the systems further comprise: at least on user feedback unit, at least one battery backup unit, communication hardware and software, at least one remote control unit, or mixtures and combinations thereof. The sensors, processing units, power supply units, the user feedback units, the battery backup units, the remote control units are in electrical communication with each other. In other embodiments, the systems further comprise: at least one battery backup unit, where the battery backup units are in electrical communication with the other hardware and units. In other embodiments, faster motion causes a faster movement of the target object or objects toward the selection object or objects or causes a greater differentiation of the target object or objects from non-target object or objects. In other embodiments, the non-target object or objects move away from the selection object as the target object or objects move toward the selection object or objects to aid in object differentiation. In other embodiments, the target objects and/or the non-target objects are displayed in list, group, or array forms and are either partially or wholly visible or partially or wholly invisible. In other embodiments, if the activated object or objects have subobjects and/or attributes associated therewith, then as the object or objects move toward the selection object, the subobjects and/or attributes appear and become more discernible as the target object or objects becomes more certain. In other embodiments, the target subobjects and/or the non-target subobjects are displayed in list, group, or array forms and are either partially or wholly visible or partially or wholly invisible. In other embodiments, once the target object or objects have been selected, then further motion within the active zones of the motion sensors causes selectable subobjects or selectable attributes aligned with the motion direction to move towards, away and/or at an angle to the selection object(s) or become differentiated from non-aligned selectable subobjects or selectable attributes and motion continues until a target selectable subobject or attribute or a plurality of target selectable objects and/or attributes are discriminated from non-target selectable subobjects and/or attributes resulting in activation of the target subobject, attribute, subobjects, or attributes. In other embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the motion sensors sense a second motion including second motion properties within the active zones, generate at least one output signal, and send the output signals to the processing units, and the processing units convert the output signals into a confirmation command confirming the selection or at least one second command function for controlling different objects or different object attributes. In other embodiments, the motion sensors sense motions including motion properties of two or more animals, humans, robots, or parts thereof, or objects under the control of humans, animals, and/or robots within the active zones, generate output signals corresponding to the motions, and send the output signals to the processing units, and the processing units convert the output signals into command function or confirmation commands or combinations thereof implemented simultaneously or sequentially, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Embodiments of this invention relate broadly to methods for controlling objects comprising: sensing motion including motion properties within an active sensing zone of at least one motion sensor, where the motion properties include a direction, a velocity, an acceleration, a change in direction, a change in velocity, a change in acceleration, a rate of change of direction, a rate of change of velocity, a rate of change of acceleration, stops, holds, timed holds, or mixtures and combinations thereof, producing an output signal or a plurality of output signals corresponding to the sensed motion, converting the output signal or signals via a processing unit in communication with the motion sensors into a command function or a plurality of command functions. The command functions comprise: (1) a start function, (2) a scroll function, (3) a select function, (4) an attribute function, (5) an attribute control function, (6) a simultaneous control function including: (g) a select and scroll function, (h) a select, scroll and activate function, (i) a select, scroll, activate, and attribute control function, (j) a select and activate function, (k) a select and attribute control function, (1) a select, active, and attribute control function, or (m) combinations thereof, or (7) combinations thereof. The methods also include processing the command function or the command functions simultaneously or sequentially, where the start functions activate at least one selection or cursor object and a plurality of selectable objects upon first sensing motion by the motion sensor and selectable objects aligned with the motion direction move toward the selection object or become differentiated from non-aligned selectable objects and motion continues until a target selectable object or a plurality of target selectable objects are discriminated from non-target selectable objects resulting in activation of the target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. The objects comprise real world objects, virtual objects or mixtures and combinations thereof, where the real world objects include physical, mechanical, electro-mechanical, magnetic, electro-magnetic, electrical, or electronic devices or any other real world device that can be controlled by a processing unit and the virtual objects include any construct generated in a virtual world or by a computer and displayed by a display device and that are capable of being controlled by a processing unit. The attributes comprise activatable, executable and/or adjustable attributes associated with the objects. The changes in motion properties are changes discernible by the motion sensors and/or the processing units. In certain embodiments, the motion sensor is selected from the group consisting of digital cameras, optical scanners, optical roller ball devices, touch pads, inductive pads, capacitive pads, holographic devices, laser tracking devices, thermal devices, acoustic devices, any other device capable of sensing motion, arrays of motion sensors, and mixtures or combinations thereof. In other embodiments, the objects include lighting devices, cameras, ovens, dishwashers, stoves, sound systems, display systems, alarm systems, control systems, medical devices, robots, robotic control systems, hot and cold water supply devices, air conditioning systems, heating systems, ventilation systems, air handling systems, computers and computer systems, chemical plant control systems, computer operating systems, systems, graphics systems, business software systems, word processor systems, internet browsers, accounting systems, military systems, virtual reality systems, augmented reality systems, control systems, other software systems, programs, routines, objects and/or elements, remote control systems, or mixtures and combinations thereof. In other embodiments, if the timed hold is brief, then the processing unit causes an attribute to be adjusted to a preset level. In other embodiments, if the timed hold is continued, then the processing unit causes an attribute to undergo a high value/low value cycle that ends when the hold is removed. In other embodiments, the timed hold causes an attribute value to change so that (1) if the attribute is at its maximum value, the timed hold causes the attribute value to decrease at a predetermined rate, until the timed hold is removed, (2) if the attribute value is at its minimum value, then the timed hold causes the attribute value to increase at a predetermined rate, until the timed hold is removed, (3) if the attribute value is not the maximum or minimum value, then the timed hold causes randomly selects the rate and direction of attribute value change or changes the attribute to allow maximum control, or (4) the timed hold causes a continuous change in the attribute value in a direction of the initial motion until the timed hold is removed. In other embodiments, the methods further comprise: sensing second motion including second motion properties within the active sensing zone of the motion sensors, producing a second output signal or a plurality of second output signals corresponding to the second sensed motion, converting the second output signal or signals via the processing units in communication with the motion sensors into a second command function or a plurality of second command functions, and confirming the selection based on the second output signals, or processing the second command function or the second command functions and moving selectable objects aligned with the second motion direction toward the selection object or become differentiated from non-aligned selectable objects and motion continues until a second target selectable object or a plurality of second target selectable objects are discriminated from non-target second selectable objects resulting in activation of the second target object or objects, where the motion properties include a touch, a lift off, a direction, a velocity, an acceleration, a change in direction, a change in velocity, a change in acceleration, a rate of change of direction, a rate of change of velocity, a rate of change of acceleration, stops, holds, timed holds, or mixtures and combinations thereof. In certain embodiments, sensing motions including motion properties of two or more animals, humans, robots, or parts thereof within the active zones of the motion sensors, producing output signals corresponding to the motions, converting the output signals into command function or confirmation commands or combinations thereof, where the start functions activate a plurality of selection or cursor objects and a plurality of selectable objects upon first sensing motion by the motion sensor and selectable objects aligned with the motion directions move toward the selection objects or become differentiated from non-aligned selectable objects and the motions continue until target selectable objects or pluralities of target selectable objects are discriminated from non-target selectable objects resulting in activation of the target objects and the confirmation commands confirm the selections.

Suitable Components for Use in the Invention

Motion Sensors

Suitable motion sensors include, without limitation, optical sensors, acoustic sensors, thermal sensors, optoacoustic sensors, wave form sensors, pixel differentiators, or any other sensor or combination of sensors that are capable of sensing movement or changes in movement, or mixtures and combinations thereof. Suitable motion sensing apparatus include, without limitation, motion sensors of any form such as digital cameras, optical scanners, optical roller ball devices, touch pads, inductive pads, capacitive pads, holographic devices, laser tracking devices, thermal devices, electromagnetic field (EMF) sensors, wave form sensors, any other device capable of sensing motion, changes in EMF, changes in wave form, or the like or arrays of such devices or mixtures or combinations thereof. The sensors may be digital, analog, or a combination of digital and analog. The motion sensors may be touch pads, touchless pads, touch sensors, touchless sensors, inductive sensors, capacitive sensors, optical sensors, acoustic sensors, thermal sensors, optoacoustic sensors, electromagnetic field (EMF) sensors, strain gauges, accelerometers, pulse or waveform sensor, any other sensor that senses movement or changes in movement, or mixtures and combinations thereof. The sensors may be digital, analog, or a combination of digital and analog or any other type. For camera systems, the systems may sense motion within a zone, area, or volume in front of the lens or a plurality of lens. Optical sensors include any sensor using electromagnetic waves to detect movement or motion within in active zone. The optical sensors may operate in any region of the electromagnetic spectrum including, without limitation, radio frequency (RF), microwave, near infrared (IR), IR, far IR, visible, ultra violet (UV), or mixtures and combinations thereof. Exemplary optical sensors include, without limitation, camera systems, the systems may sense motion within a zone, area or volume in front of the lens. Acoustic sensor may operate over the entire sonic range which includes the human audio range, animal audio ranges, other ranges capable of being sensed by devices, or mixtures and combinations thereof. EMF sensors may be used and operate in any frequency range of the electromagnetic spectrum or any waveform or field sensing device that are capable of discerning motion with a given electromagnetic field (EMF), any other field, or combination thereof. Moreover, LCD screen(s), other screens and/or displays may be incorporated to identify which devices are chosen or the temperature setting, etc. Moreover, the interface may project a virtual control surface and sense motion within the projected image and invoke actions based on the sensed motion. The motion sensor associated with the interfaces of this invention can also be acoustic motion sensor using any acceptable region of the sound spectrum. A volume of a liquid or gas, where a user's body part or object under the control of a user may be immersed, may be used, where sensors associated with the liquid or gas can discern motion. Any sensor being able to discern differences in transverse, longitudinal, pulse, compression or any other waveform could be used to discern motion and any sensor measuring gravitational, magnetic, electro-magnetic, or electrical changes relating to motion or contact while moving (resistive and capacitive screens) could be used. Of course, the interfaces can include mixtures or combinations of any known or yet to be invented motion sensors. The motion sensors may be used in conjunction with displays, keyboards, touch pads, touchless pads, sensors of any type, or other devices associated with a computer, a notebook computer or a drawing tablet or any mobile or stationary device.

Suitable motion sensing apparatus include, without limitation, motion sensors of any form such as digital cameras, optical scanners, optical roller ball devices, touch pads, inductive pads, capacitive pads, holographic devices, laser tracking devices, thermal devices, EMF sensors, wave form sensors, MEMS sensors, any other device capable of sensing motion, changes in EMF, changes in wave form, or the like or arrays of such devices or mixtures or combinations thereof. Other motion sensors that sense changes in pressure, in stress and strain (strain gauges), changes in surface coverage measured by sensors that measure surface area or changes in surface are coverage, change in acceleration measured by accelerometers, or any other sensor that measures changes in force, pressure, velocity, volume, gravity, acceleration, any other force sensor or mixtures and combinations thereof.

Controllable Objects

Suitable physical mechanical, electro-mechanical, magnetic, electro-magnetic, electrical, or electronic devices, hardware devices, appliances, biometric devices, automotive devices, VR objects, AR objects, MR objects, and/or any other real world device that can be controlled by a processing unit include, without limitation, any electrical and/or hardware device or appliance having attributes which can be controlled by a switch, a joy stick, a stick controller, or similar type controller, or software program or object. Exemplary examples of such attributes include, without limitation, ON, OFF, intensity and/or amplitude, impedance, capacitance, inductance, software attributes, lists or submenus of software programs or objects, haptics, or any other controllable electrical and/or electro-mechanical function and/or attribute of the device. Exemplary examples of devices include, without limitation, environmental controls, building systems and controls, lighting devices such as indoor and/or outdoor lights or light fixtures, cameras, ovens (conventional, convection, microwave, and/or etc.), dishwashers, stoves, sound systems, mobile devices, display systems (TVs, VCRs, DVDs, cable boxes, satellite boxes, and/or etc.), alarm systems, control systems, air conditioning systems (air conditions and heaters), energy management systems, medical devices, vehicles, robots, robotic control systems, UAV, equipment and machinery control systems, hot and cold water supply devices, air conditioning system, heating systems, fuel delivery systems, energy management systems, product delivery systems, ventilation systems, air handling systems, computers and computer systems, chemical plant control systems, manufacturing plant control systems, computer operating systems and other software systems, programs, routines, objects, and/or elements, remote control systems, or the like virtual and augmented reality systems, holograms, or mixtures or combinations thereof.

Software Systems

Suitable software systems, software products, and/or software objects that are amenable to control by the interface of this invention include, without limitation, any analog or digital processing unit or units having single or a plurality of software products installed thereon and where each software product has one or more adjustable attributes associated therewith, or singular software programs or systems with one or more adjustable attributes, menus, lists or other functions or display outputs. Exemplary examples of such software products include, without limitation, operating systems, graphics systems, business software systems, word processor systems, business systems, online merchandising, online merchandising systems, purchasing and business transaction systems, databases, software programs and applications, internet browsers, accounting systems, military systems, control systems, or the like, or mixtures or combinations thereof. Software objects generally refer to all components within a software system or product that are controllable by at least one processing unit.

Processing Units

Suitable processing units for use in the present invention include, without limitation, digital processing units (DPUs), analog processing units (APUs), any other technology that can receive motion sensor output and generate command and/or control functions for objects under the control of the processing unit, or mixtures and combinations thereof.

Suitable digital processing units (DPUs) include, without limitation, any digital processing unit capable of accepting input from a plurality of devices and converting at least some of the input into output designed to select and/or control attributes of one or more of the devices. Exemplary examples of such DPUs include, without limitation, microprocessor, microcontrollers, or the like manufactured by Intel, Motorola, Ericsson, HP, Samsung, Hitachi, NRC, Applied Materials, AMD, Cyrix, Sun Microsystem, Philips, National Semiconductor, Qualcomm, or any other manufacture of microprocessors or microcontrollers.

Suitable analog processing units (APUs) include, without limitation, any analog processing unit capable of accepting input from a plurality of devices and converting at least some of the input into output designed to control attributes of one or more of the devices. Such analog devices are available from manufacturers such as Analog Devices Inc.

User Feedback Units

Suitable user feedback units include, without limitation, cathode ray tubes, liquid crystal displays, light emitting diode displays, organic light emitting diode displays, plasma displays, touch screens, touch sensitive input/output devices, audio input/output devices, audio-visual input/output devices, keyboard input devices, mouse input devices, any other input and/or output device that permits a user to receive computer generated output signals and create computer input signals.

DETAILED DESCRIPTION OF THE DRAWING OF THE DISCLOSURE

Referring now to FIGS. 1A-D, a sequence of flat or 2D displayed map and calendar showing visualization of associated calendar and map data and interactions thereof is shown.

Looking at FIG. 1A, a display screen is shown, generally 100, to include a calendar window 110 and a map window 150. The calendar window 110 include a calendar 112 including a month banner 114 shown here as the month of January 2017 and the body 116 of the calendar 110 shown in a standard calendar format days in columns day numbers in rows. The calendar 110 includes five event entries, Event 1, Event 2, Event 3, Event 4, and Event 5. Event 1 is a five day event spanning January 2-6; Event 2 is a four day event spanning January 10-13; Event 3 is a two day event spanning January 19-20; Event 4 is a three day event spanning January 25-27; and Event 5 is a five day event spanning January 30-31. As can be seen, each event has an event icon in each day that the event lasts so that the Event 1 icon appears in each day of the event. The calendar 106 also includes zones for moving backwards and forwards through the months within a given year indicated by "<" and ">" icons, and for moving backwards and forwards through the years indicated by the "<<" and ">>" icons. The calendar 110 also includes hot zones 1-31 indicating the calendar days of the month of January, which when activated brings up information about the selected day. The calendar 110 also includes hot zones Feb, Mar, Apr, May, and Jun for going directly to the months of February, March, April, May, and June, which would update based on the current month. Of course, these hot zones may include past and future months or may be user defined. The map window 150 includes a road map of the United States 152, continental and Alaska and Hawaii.

Figure 1B:
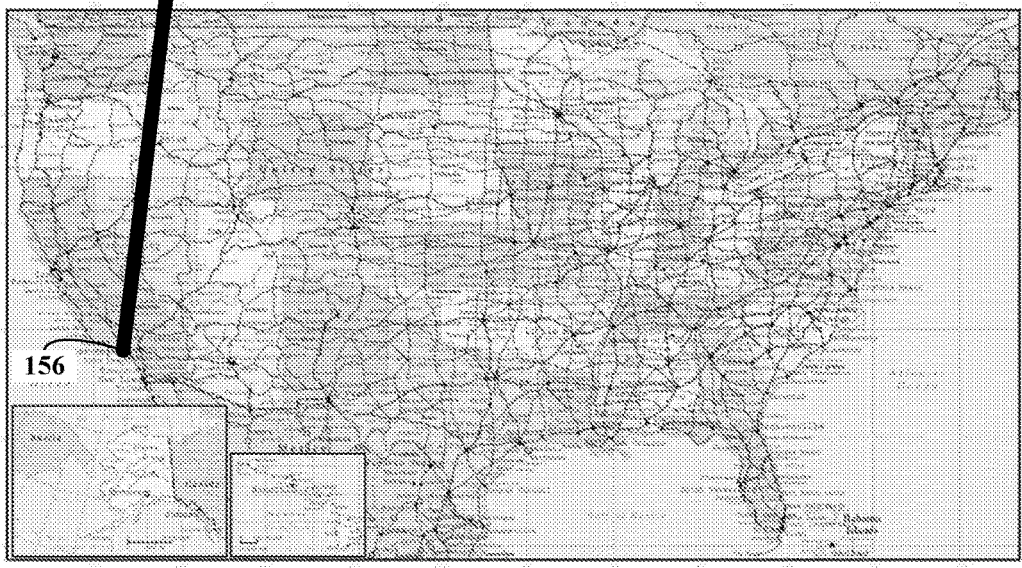

Looking at FIG. 1B, the display screen 100 evidences motion sensed within an active zone of a motion sensor above at least one threshold motion criteria such as duration, direction, and/or any other threshold criteria for distinguishing random motion, where the motion either comprises a hold over one of the Event 1 icons or moves towards one of the Event 1 icons in a manner that Event 1 is distinguished from all of the other events. Once the processing unit determines that the motion is sufficient to discriminate the selection of Event 1 from the other events, a ray or light beam 154 emanates from the Event 1 icon to a location 156 on the map 152 corresponding to the location of event, here Los Angeles. As shown here, the ray or beam 154 is shown as having a thickness corresponding to the duration of the event—5 day event, 6 pt line thickness. Additionally, if the motion was in a direction that the processing unit could not distinguished between more than one event, then the processing unit would move the event icon is such as way to permit further motion to permit event icon discrimination as set forth herein above.

Figure 1C:
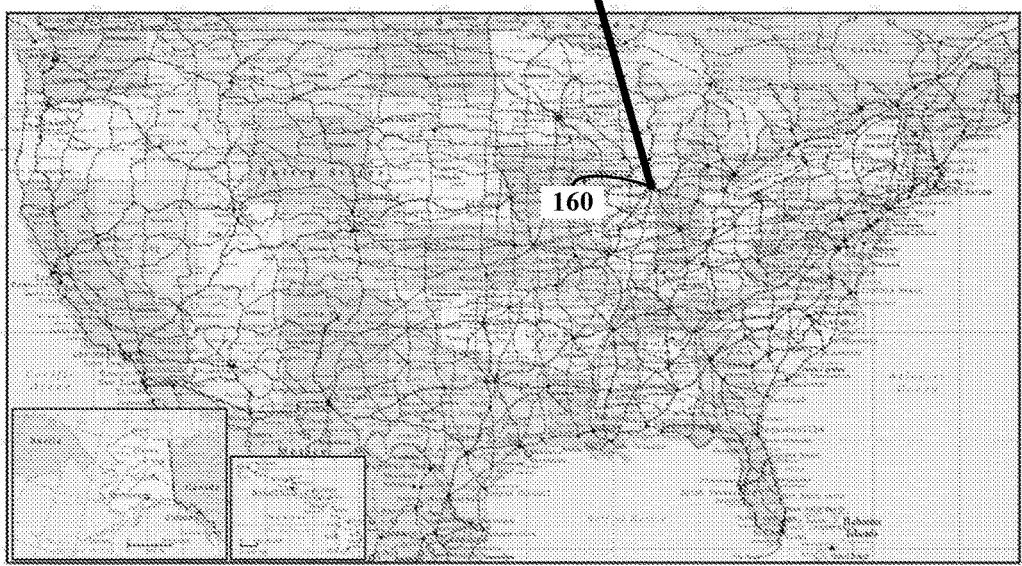

Looking at FIG. 1C, the display screen 100 evidences motion or a second motion sensed within the active zone of the motion sensor, where the motion or second motion either comprises a hold over one of the Event 4 icons or moves towards one of the Event 4 icons in a manner that Event 4 is distinguished from all of the other events. Once the processing unit determines that the motion is sufficient to discriminate the selection of Event 4 from the other events, a ray or a light beam 158 emanates from the Event 4 icon to a location 160 on the map 152 corresponding to the location of event, here Chicago. As shown here, the ray or beam 158 is shown as having a thickness corresponding to the duration of the event—3 day event, 3 pt line thickness. Additionally, if the motion was in a direction that the processing unit could not distinguished between more than one event, then the processing unit would move the event icon is such as way to permit further motion to permit event icon discrimination as set forth herein above.

Figure 1D:
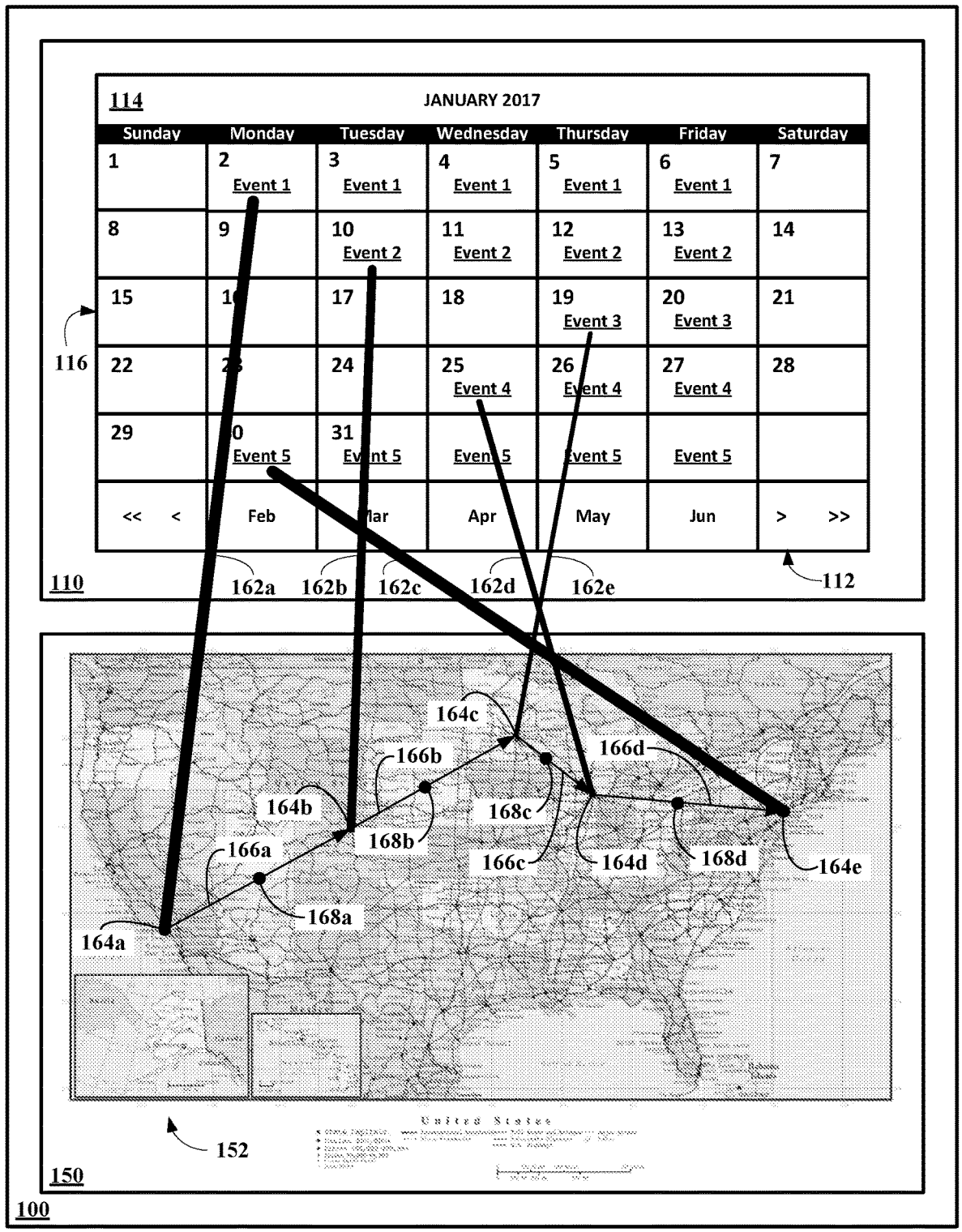

Looking at FIG. 1D, the display screen 100 evidences motion or a second motion sensed within the active zone of the motion sensor, where the motion or second motion either comprises a hold over the month banner 114 or moves towards the month banner 114 in a manner that the month banner 114 is distinguished from all of the other selectable objects including the events, the days, the hot zones, and the forward and backward month and year icons. Once the processing unit determines that the motion is sufficient to discriminate the selection of the month banner 114 from the other selectable objects, rays or light beams 162*a-e* emanate from all of the first event icon of each Event 1-5 to locations 164*a-e* on the map 152 corresponding to the location of each event, here Los Angeles, Denver, Minneapolis, Chicago, and New York, respectively. The processing unit also causes line segments 166*a-d* to be drawn connecting the city locations 164*a-e* in a sequence corresponding to the event dates. The processing unit may also display hot zones 168*a-d* represented here by circles that when activated display relevant travel information for traveling between each location. Alternatively, the processing unit may be configured to treat each line segment 166*a-d* has a hot zone so that motion towards or onto the line would result in the display of relevant travel information. The rays or beams 162*a-e* have thickness reflecting the duration of the event. Five day events have 6 pt line thickness; four day events have 4.5 pt line thickness; three day events have 3 pt line thickness; two day events have 2.25 pt line thickness; and one day events have 1.5 pt line thickness. Further it should be recognized that the events and associated rays or beams may be and in general would be color coded to better distinguish the events. Additionally, the color coding may be indicative of the type of event. Event data may include not only specific information about the event, but may also include information about the event location, information on how to get to the event, information about the city in which the event is occurring and any other relevant information about the event, the location, the city, the people or companies in attending the event, or any other information the user may desire to be displayed.

Referring now to FIG. 2A-D, a sequence of flat or 2D displayed map, calendar, and event data showing visualization of associated calendar, map, and event data and interactions therebetween is shown.

Figure 2A:
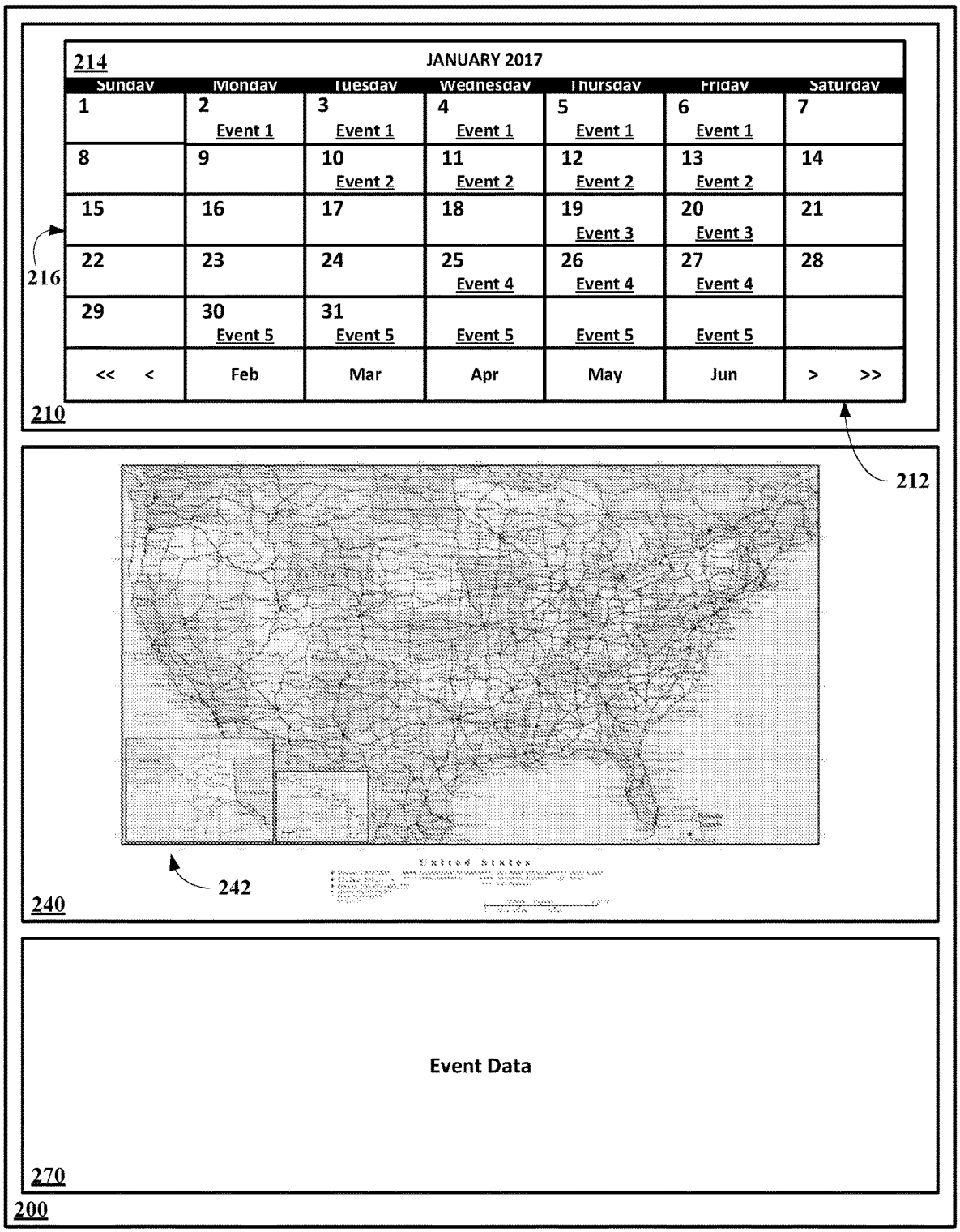
FIG. 2A-D depict a sequence of flat or 2D displayed map, calendar, and event data showing visualization of associated calendar, map, and event data and interactions thereof.

Looking at FIG. 2A, a display screen is shown, generally 200, to include a calendar window 210, a map window 240, and an event data window 270. The calendar window 210 include a calendar 212 including a month banner 214 shown here as the month of January 2017 and the body 216 of the calendar 210 shown in a standard calendar format days in columns day numbers in rows. The calendar 210 includes five event entries, Event 1, Event 2, Event 3, Event 4, and Event 5. Event 1 is a five day event spanning January 2-6; Event 2 is a four day event spanning January 10-13; Event 3 is a two day event spanning January 19-20; Event 4 is a three day event spanning January 25-27; and Event 5 is a five day event spanning January 30-31. As can be seen, each event has an event icon in each day that the event lasts so that the Event 1 icon appears in each day of the event. The calendar 106 also includes zones for moving backwards and forwards through the months within a given year indicated by "<" and ">" icons, and for moving backwards and forwards through the years indicated by the "<<" and ">>" icons. It should also be recognized that z-axis or other axis motion may be using for processing command functions. The calendar 210 also includes hot zones 1-31 indicating the calendar days of the month of January, which when activated brings up information about the selected day. The calendar 210 also includes hot zones Feb, Mar, Apr, May, and Jun for going directly to the months of February, March, April, May, and June, which would update based on the current month. Of course, these hot zones may include past and future months or may be user defined. The map window 240 includes a road map of the United States 242, continental and Alaska and Hawaii. The event window 270 simply shown a icon indicating that event data is to be displayed there. Event data may include not only specific information about the event, but may also include information about the event location, information on how to get to the event, information about the city in which the event is occurring and any other relevant information about the event, the location, the city, the people or companies in attending the event, or any other information the user may desire to be displayed.

Figure 2B:
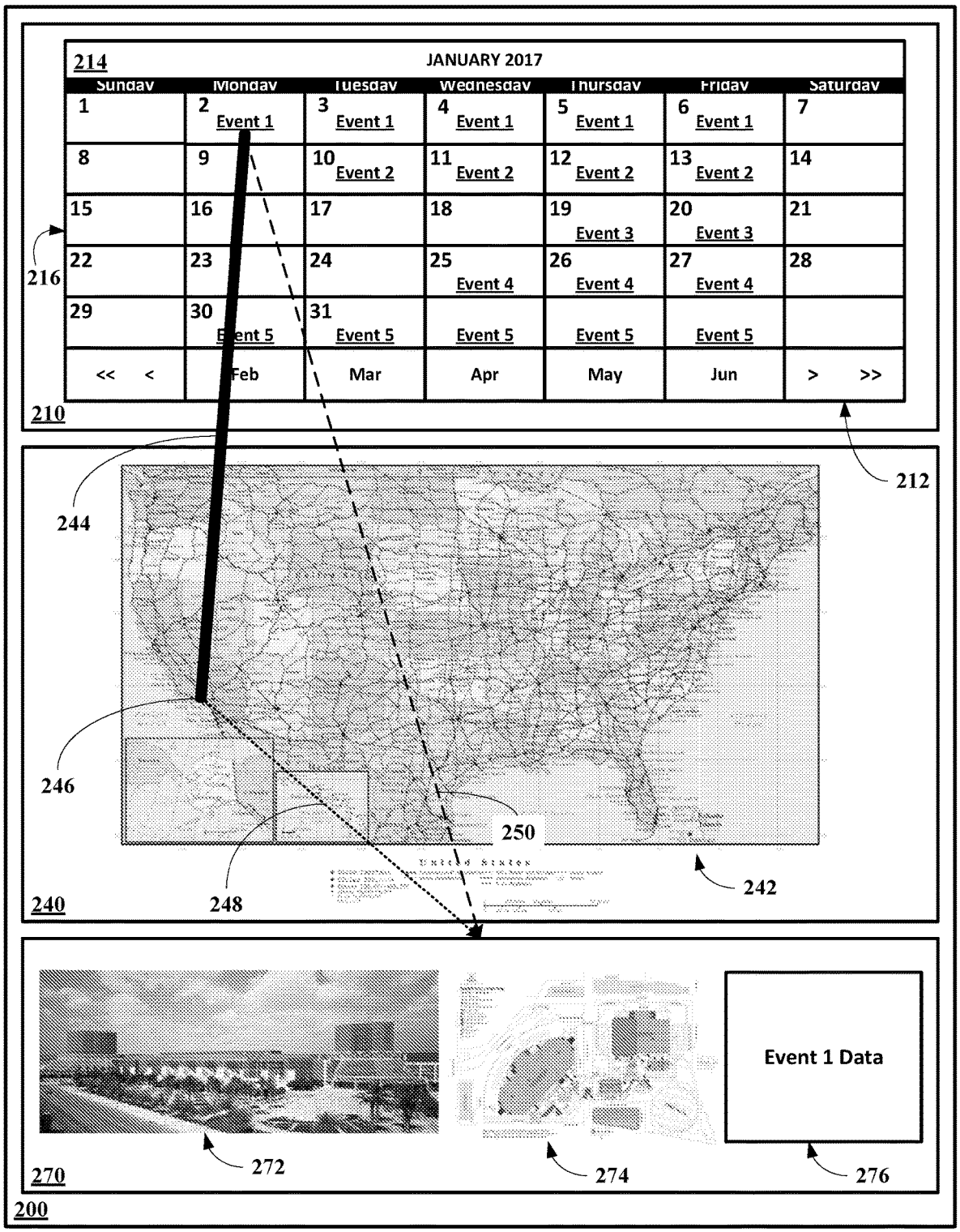

Looking at FIG. 2B, the display screen 200 evidences motion sensed within an active zone of a motion sensor above at least one threshold motion criteria such as duration, direction, and/or any other threshold criteria for distinguishing random motion, where the motion either comprises a hold over one of the Event 1 icons or moves towards one of the Event 1 icons in a manner that Event 1 is distinguished from all of the other events. Once the processing unit determines that the motion is sufficient to discriminate the selection of Event 1 from the other events, a ray or light beam 244 emanates from the Event 1 icon to a location 246 on the map 242 corresponding to the location of event, here Los Angeles. As shown here, the ray or beam 244 is shown as having a thickness corresponding to the duration of the event—5 day event, 6 pt line thickness. Additionally, if the motion was in a direction that the processing unit could not distinguished between more than one event, then the processing unit would move the event icon is such as way to permit further motion to permit event icon discrimination as set forth herein above. Simultaneously or sequentially, the processing unit also displays information in the event data window 270. The information shown here includes a picture of the venue 272, a schematic layout of the venue 274, and an event 1 data box 276. When activated, the box 276 may display event data including event schedule, event speakers, and other event information. Simultaneously or sequentially, the processing unit also generate a ray or beam 248 (shown here as a dotted line) emanating from the location 246 to the event data window 270 and/or may also generate a ray or beam 250 (shown here as a dashed line) emanating from Event 1 to the event data window 270.

Figure 2C:
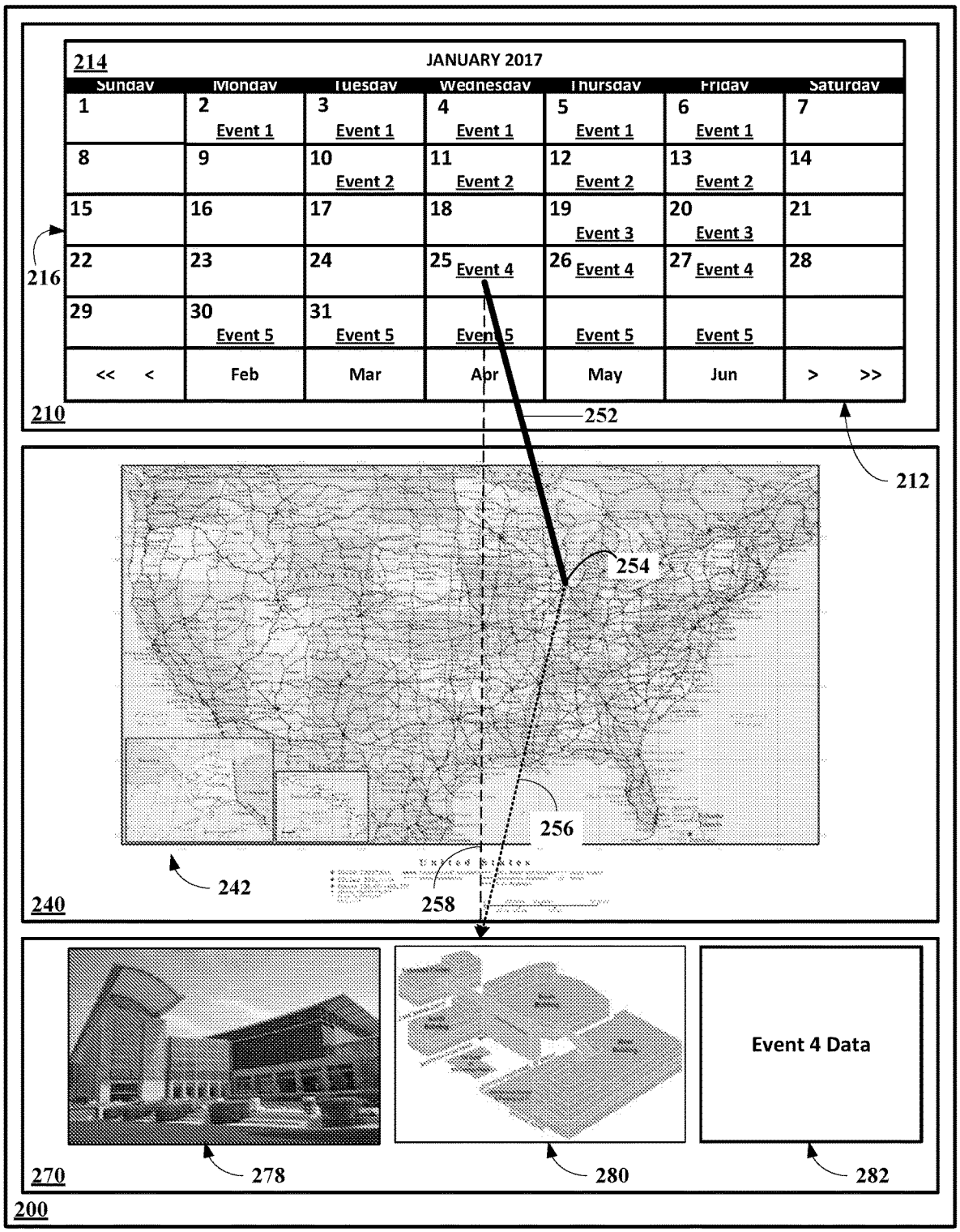

Looking at FIG. 2C, the display screen 200 evidences motion or a second motion sensed within the active zone of the motion sensor, where the motion or second motion either comprises a hold over one of the Event 4 icons or moves towards one of the Event 4 icons in a manner that Event 4 is distinguished from all of the other events. Once the processing unit determines that the motion is sufficient to discriminate the selection of Event 4 from the other events, a ray or a light beam 252 emanates from the Event 4 icon to a location 254 on the map 242 corresponding to the location of event, here Chicago. As shown here, the ray or beam 252 is shown as having a thickness corresponding to the duration of the event—3 day event, 3 pt line thickness. Additionally, if the motion was in a direction that the processing unit could not distinguished between more than one event, then the processing unit would move the event icon is such as way to permit further motion to permit event icon discrimination as set forth herein above. Simultaneously or sequentially, the processing unit also displays information in the event data window 270. The information shown here includes a picture of the venue 278, a schematic layout of the venue 280, and an event 1 data box 282. When activated, the box 282 may display event data including event schedule, event speakers, and other event information. Simultaneously or sequentially, the processing unit may also generate a ray or beam 256 (shown here as a dotted line) emanating from the location 254 to the event data window 270 and/or a ray or beam 258 (shown here as a dashed line) emanating from Event 4 to the event data window 270.

Figure 2D:
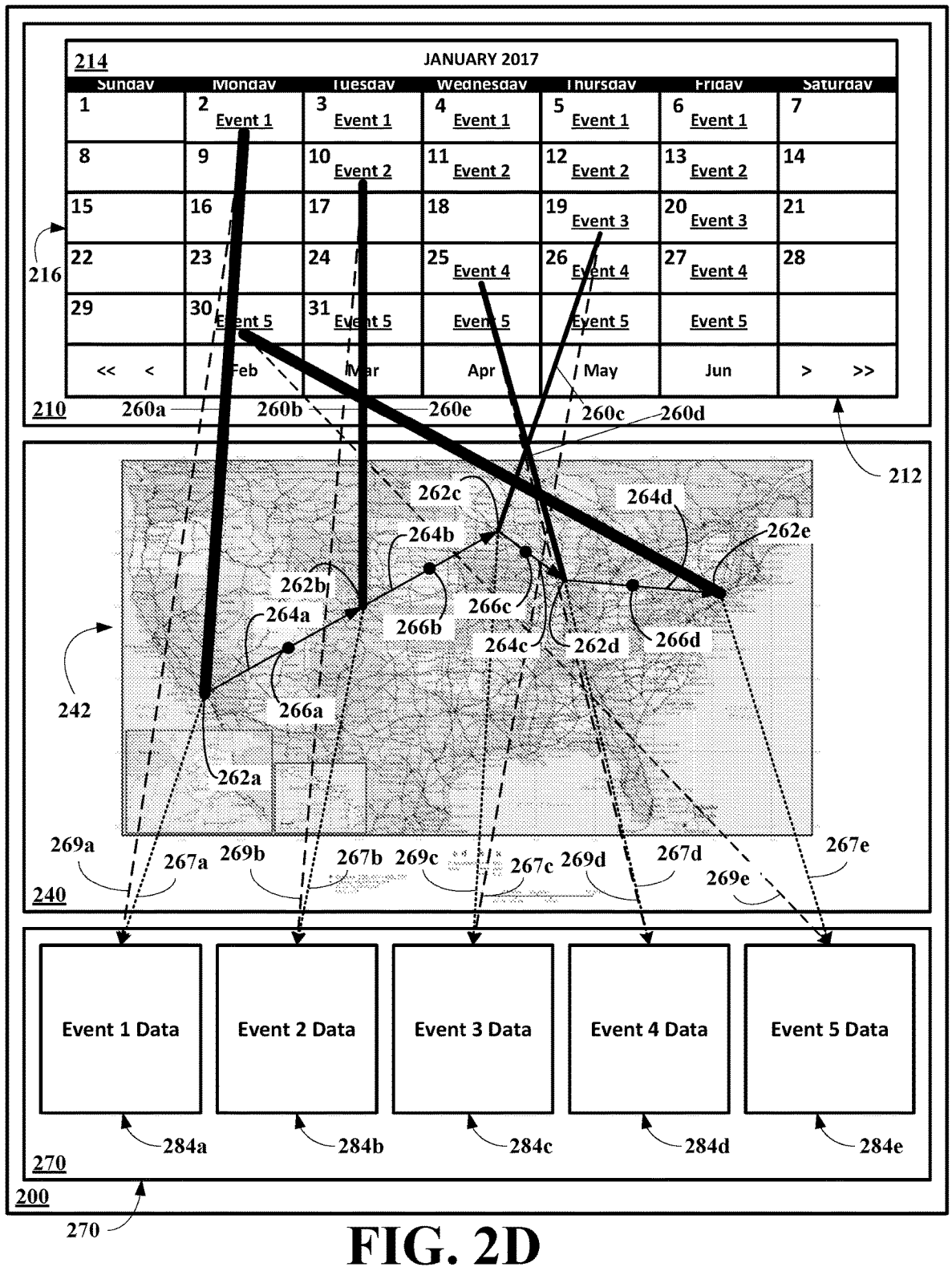

Looking at FIG. 2D, the display screen 200 evidences motion or a second motion sensed within the active zone of the motion sensor, where the motion or second motion either comprises a hold over the month banner 214 or moves towards the month banner 214 in a manner that the month banner 214 is distinguished from all of the other selectable objects including the events, the days, the hot zones, and the forward and backward month and year icons. Once the processing unit determines that the motion is sufficient to discriminate the selection of the month banner 214 from the other selectable objects, rays or light beams 260a-e emanate from all of the first event icon of each Event 1-5 to locations 262a-e on the map 242 corresponding to the location of each event, here Los Angeles, Denver, Minneapolis, Chicago, and New York, respectively. The processing unit also causes line segments 264a-d to be drawn connecting the city locations 262a-e in a sequence corresponding to the event dates. The processing unit may also display hot zones 266a-d represented here by circles that when activated display relevant travel information for traveling between each location. Alternatively, the processing unit may be configured to treat each line segment 264a-d has a hot zone so that motion towards or onto the line would result in the display of relevant travel information. The rays or beams 260a-e have thickness reflecting the duration of the event. Five day events have 6 pt line thickness; four day events have 4.5 pt line thickness; three day events have 3 pt line thickness; two day events have 2.25 pt line thickness; and one day events have 1.5 pt line thickness. Further it should be recognized that the events and associated rays or beams may be and in general would be color coded to better distinguish the events. Additionally, the color coding may be indicative of the type of event. Event data may include not only specific information about the event, but may also include information about the event location, information on how to get to the event, information about the city in which the event is occurring and any other relevant information about the event, the location, the city, the people or companies in attending the event, or any other information the user may desire to be displayed. Simultaneously or sequentially, the processing unit also displays information in the event data window 270. The information shown here includes an Event 1 Data box 284a, an Event 2 Data box 284b, an Event 3 Data box 284c, an Event 4 Data box 284d, and an Event 5 Data box 284e. Simultaneously or sequentially, the processing unit may also generate a ray or beam 267a-e (shown here as a dotted line) emanating from the locations 262a-e to the event data window 270 and/or a ray or beam 269a-e (shown here as a dashed line) emanating from Event 1-5 to the event data window 270.

Referring now to FIG. 3A-D, a sequence of 3D displayed map and calendar showing visualization of associated calendar and map data and interactions thereof is shown.

Figure 3A:
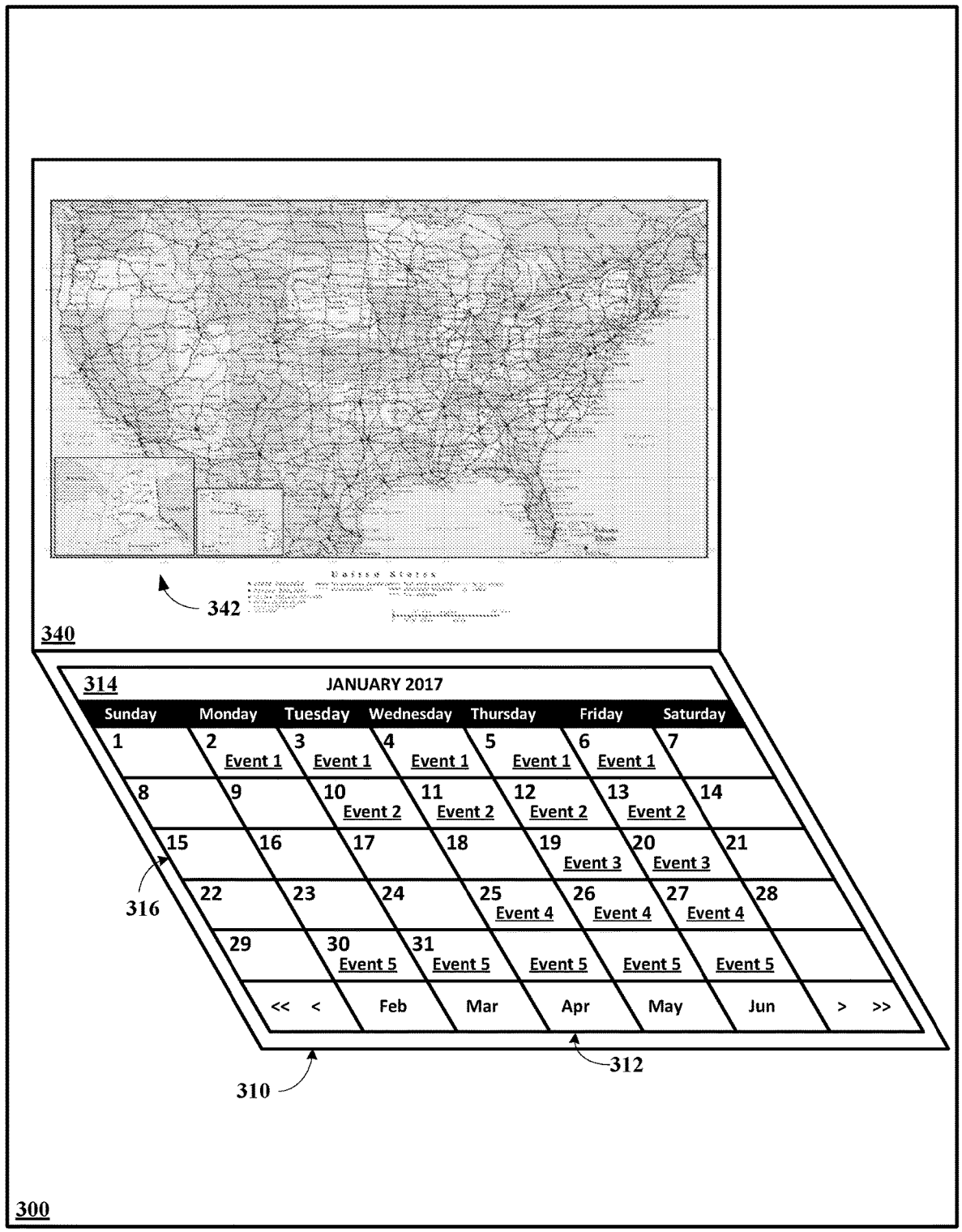
FIG. 3A-D depict a sequence of 3D displayed map and calendar showing visualization of associated calendar and map data and interactions thereof.

Looking at FIG. 3A, a display screen is shown, generally 300, to include a calendar window 310 and a map window 340. The calendar window 310 include a calendar 312 including a month banner 314 shown here as the month of January 2017 and the body 316 of the calendar 310 shown in a standard calendar format days in columns day numbers in rows. The calendar 310 includes five event entries, Event 1, Event 2, Event 3, Event 4, and Event 5. Event 1 is a five day event spanning January 2-6; Event 2 is a four day event spanning January 10-13; Event 3 is a two day event spanning January 19-20; Event 4 is a three day event spanning January 25-27; and Event 5 is a five day event spanning January 30-31. As can be seen, each event has an event icon in each day that the event lasts so that the Event 1 icon appears in each day of the event. The calendar 310 also includes zones for moving backwards and forwards through the months within a given year indicated by "<" and ">" icons, and for moving backwards and forwards through the years indicated by the "<<" and ">>" icons. The calendar 310 also includes hot zones 1-31 indicating the calendar days of the month of January, which when activated brings up information about the selected day. The calendar 310 also includes hot zones Feb, Mar, Apr, May, and Jun for going directly to the months of February, March, April, May, and June, which would update based on the current month. Of course, these hot zones may include past and future months or may be user defined. The map window 340 includes a road map of the United States 342, continental and Alaska and Hawaii.

Figure 3B:
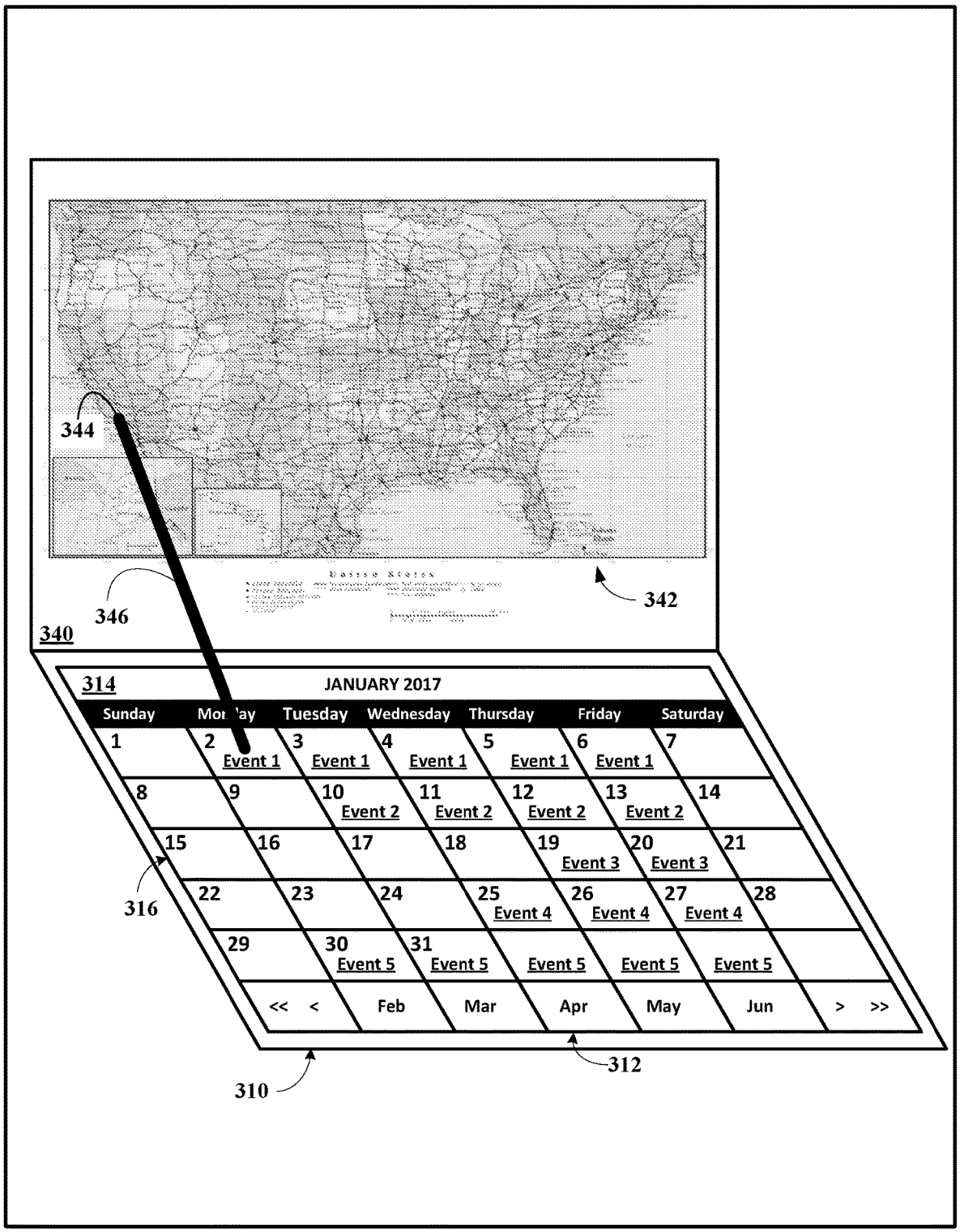

Looking at FIG. 3B, the display screen 300 evidences motion sensed within an active zone of a motion sensor above at least one threshold motion criteria such as duration, direction, and/or any other threshold criteria for distinguishing random motion, where the motion either comprises a hold over one of the Event 1 icons or moves towards one of the Event 1 icons in a manner that Event 1 is distinguished from all of the other events. Once the processing unit determines that the motion is sufficient to discriminate the selection of Event 1 from the other events, a ray or light beam 344 emanates from the Event 1 icon to a location 346 on the map 342 corresponding to the location of event, here Los Angeles. As shown here, the ray or beam 344 is shown as having a thickness corresponding to the duration of the event—5 day event, 6 pt line thickness. Additionally, if the motion was in a direction that the processing unit could not distinguished between more than one event, then the processing unit would move the event icon is such as way to permit further motion to permit event icon discrimination as set forth herein above.

Figure 3C:
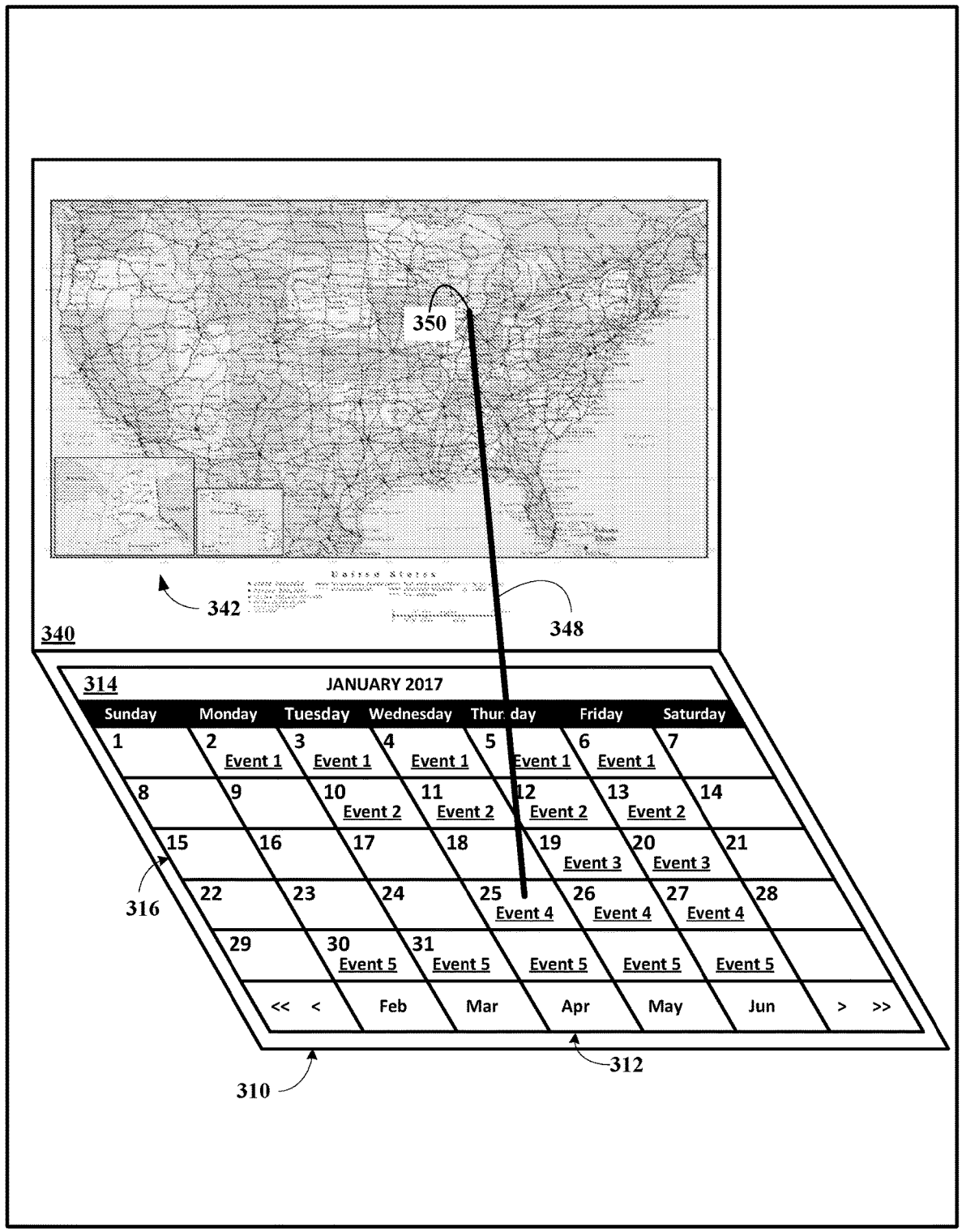

Looking at FIG. 3C, the display screen 300 evidences motion or a second motion sensed within the active zone of the motion sensor, where the motion or second motion either comprises a hold over one of the Event 4 icons or moves towards one of the Event 4 icons in a manner that Event 4 is distinguished from all of the other events. Once the processing unit determines that the motion is sufficient to discriminate the selection of Event 4 from the other events, a ray or a light beam 348 emanates from the Event 4 icon to a location 350 on the map 342 corresponding to the location of event, here Chicago. As shown here, the ray or beam 348 is shown as having a thickness corresponding to the duration of the event—3 day event, 3 pt line thickness. Additionally, if the motion was in a direction that the processing unit could not distinguished between more than one event, then the processing unit would move the event icon is such as way to permit further motion to permit event icon discrimination as set forth herein above.

Figure 3D:
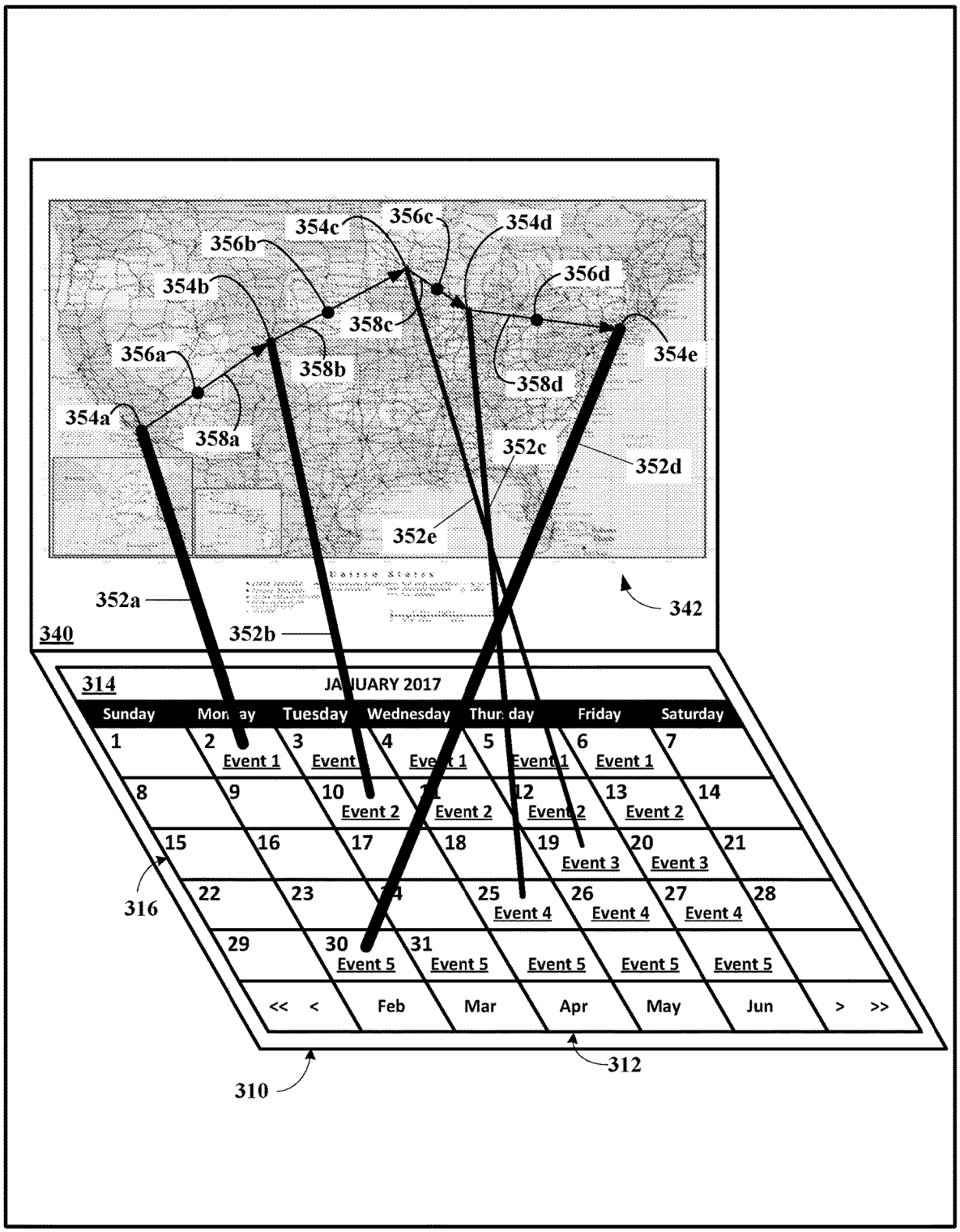

Looking at FIG. 3D, the display screen 300 evidences motion or a second motion sensed within the active zone of the motion sensor, where the motion or second motion either comprises a hold over the month banner 314 or moves towards the month banner 314 in a manner that the month banner 314 is distinguished from all of the other selectable objects including the events, the days, the hot zones, and the forward and backward month and year icons. Once the processing unit determines that the motion is sufficient to discriminate the selection of the month banner 314 from the other selectable objects, rays or light beams 352a-e emanate from all of the first event icon of each Event 1-5 to locations 354a-e on the map 342 corresponding to the location of each event, here Los Angeles, Denver, Minneapolis, Chicago, and New York, respectively. The processing unit also causes line segments 356a-d to be drawn connecting the city locations 354a-e in a sequence corresponding to the event dates. The processing unit may also display hot zones 358a-d represented here by circles that when activated display relevant travel information for traveling between each location. Alternatively, the processing unit may be configured to treat each line segment 356a-d has a hot zone so that motion towards or onto the line would result in the display of relevant travel information. The rays or beams 352a-e have thickness reflecting the duration of the event. Five day events have 6 pt line thickness; four day events have 4.5 pt line thickness; three day events have 3 pt line thickness; two day events have 2.25 pt line thickness; and one day events have 1.5 pt line thickness. Further it should be recognized that the events and associated rays or beams may be and in general would be color coded to better distinguish the events. Additionally, the color coding may be indicative of the type of event. Event data may include not only specific information about the event, but may also include information about the event location, information on how to get to the event, information about the city in which the event is occurring and any other relevant information about the event, the location, the city, the people or companies in attending the event, or any other information the user may desire to be displayed.

Referring now to FIG. 4A-D, a sequence of 3D displayed map, calendar, and event data showing visualization of associated calendar, map, and event data and interactions thereof is shown.

Figure 4A:
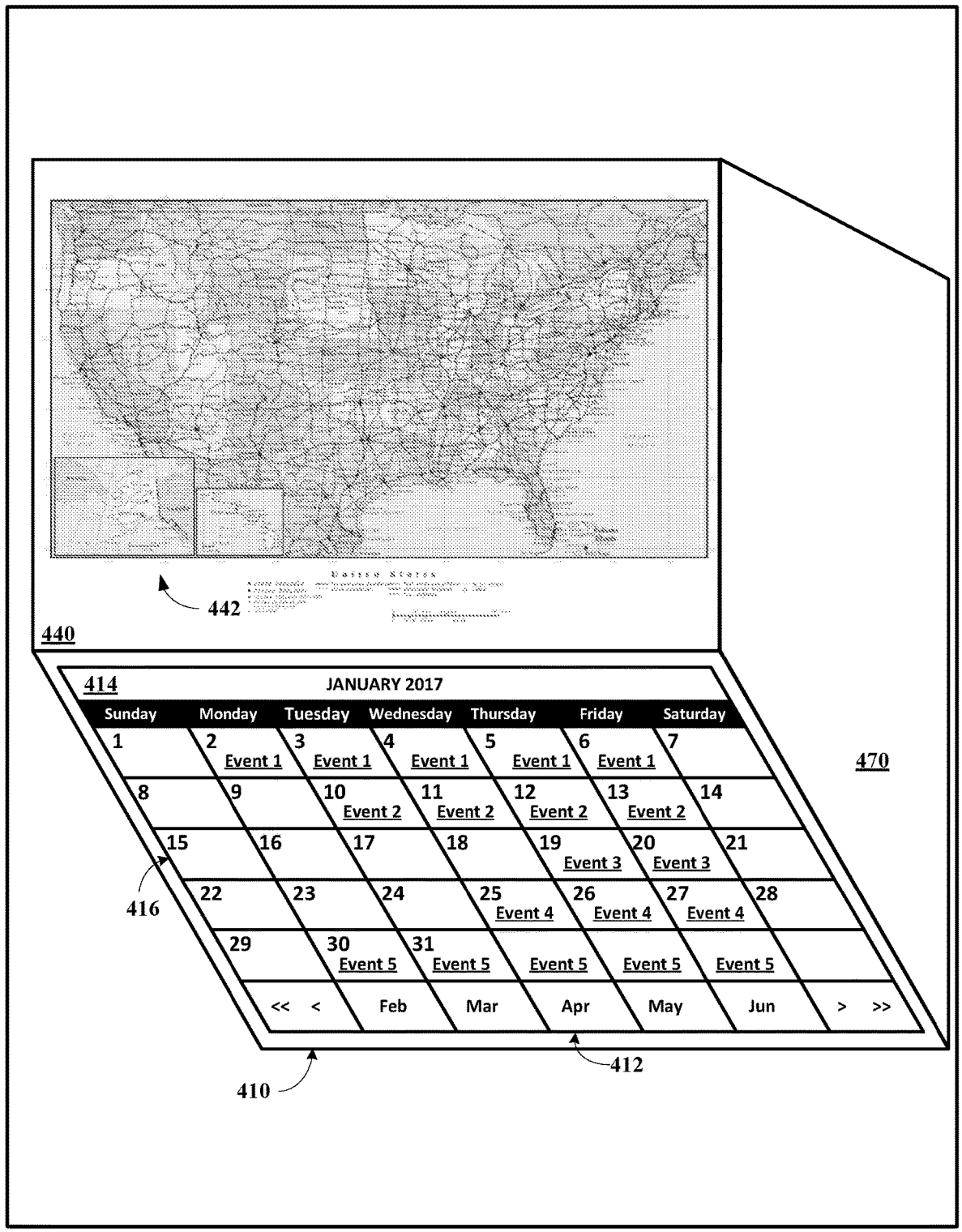
FIG. 4A-D depict a sequence of 3D displayed map, calendar, and event data showing visualization of associated calendar, map, and event data and interactions thereof.

Looking at FIG. 4A, a display screen is shown, generally 400, to include a calendar window 410, a map window 440, and an event data window 470. The calendar window 410 include a calendar 412 including a month banner 414 shown here as the month of January 2017 and the body 416 of the calendar 410 shown in a standard calendar format days in columns day numbers in rows. The calendar 410 includes five event entries, Event 1, Event 2, Event 3, Event 4, and Event 5. Event 1 is a five day event spanning January 2-6; Event 2 is a four day event spanning January 10-13; Event 3 is a two day event spanning January 19-20; Event 4 is a three day event spanning January 25-27; and Event 5 is a five day event spanning January 30-31. As can be seen, each event has an event icon in each day that the event lasts so that the Event 1 icon appears in each day of the event. The calendar 410 also includes zones for moving backwards and forwards through the months within a given year indicated by "<" and ">" icons, and for moving backwards and forwards through the years indicated by the "<<" and ">>" icons. The calendar 410 also includes hot zones 1-31 indicating the calendar days of the month of January, which when activated brings up information about the selected day. The calendar 410 also includes hot zones Feb, Mar, Apr, May, and Jun for going directly to the months of February, March, April, May, and June, which would update based on the current month. Of course, these hot zones may include past and future months or may be user defined. The map window 440 includes a road map of the United States 442, continental and Alaska and Hawaii. The event window 470 simply shown a icon indicating that event data is to be displayed there. Event data may include not only specific information about the event, but may also include information about the event location, information on how to get to the event, information about the city in which the event is occurring and any other relevant information about the event, the location, the city, the people or companies in attending the event, or any other information the user may desire to be displayed.

Figure 4B:
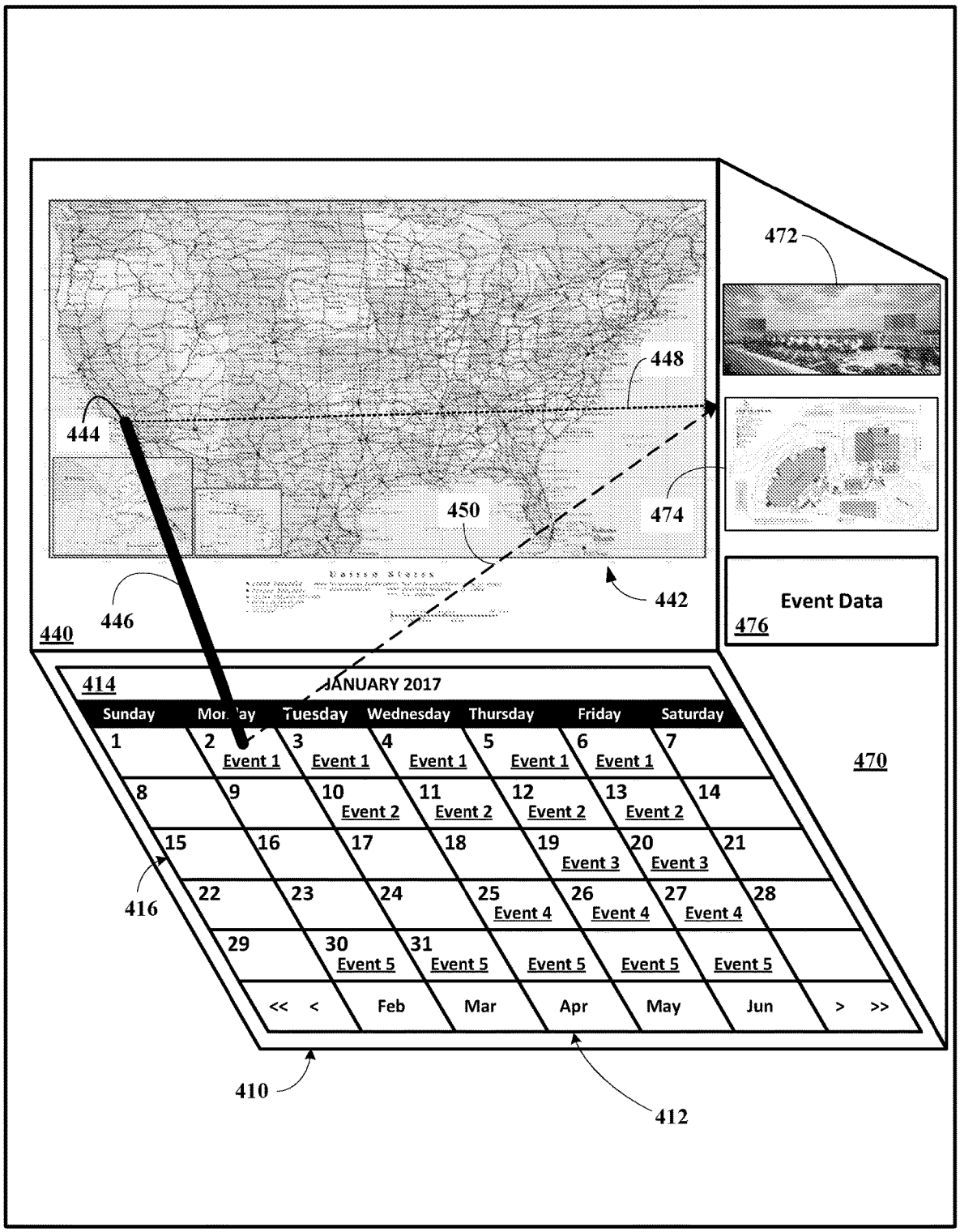

Looking at FIG. 4B, the display screen 400 evidences motion sensed within an active zone of a motion sensor above at least one threshold motion criteria such as duration, direction, and/or any other threshold criteria for distinguishing random motion, where the motion either comprises a hold over one of the Event 1 icons or moves towards one of the Event 1 icons in a manner that Event 1 is distinguished from all of the other events. Once the processing unit determines that the motion is sufficient to discriminate the selection of Event 1 from the other events, a ray or light beam 444 emanates from the Event 1 icon to a location 446 on the map 442 corresponding to the location of event, here Los Angeles. As shown here, the ray or beam 444 is shown as having a thickness corresponding to the duration of the event—5 day event, 6 pt line thickness. Additionally, if the motion was in a direction that the processing unit could not distinguished between more than one event, then the processing unit would move the event icon is such as way to permit further motion to permit event icon discrimination as set forth herein above. Simultaneously or sequentially, the processing unit also displays information in the event data window 470. The information shown here includes a picture of the venue 472, a schematic layout of the venue 474, and an event 1 data box 476. When activated, the box 476 may display event data including event schedule, event speakers, and other event information. Simultaneously or sequentially, the processing unit also generate a ray or beam 448 (shown here as a dotted line) emanating from the location 446 to the event data window 470 and/or may also generate a ray or beam 450 (shown here as a dashed line) emanating from Event 1 to the event data window 470.

Figure 4C:
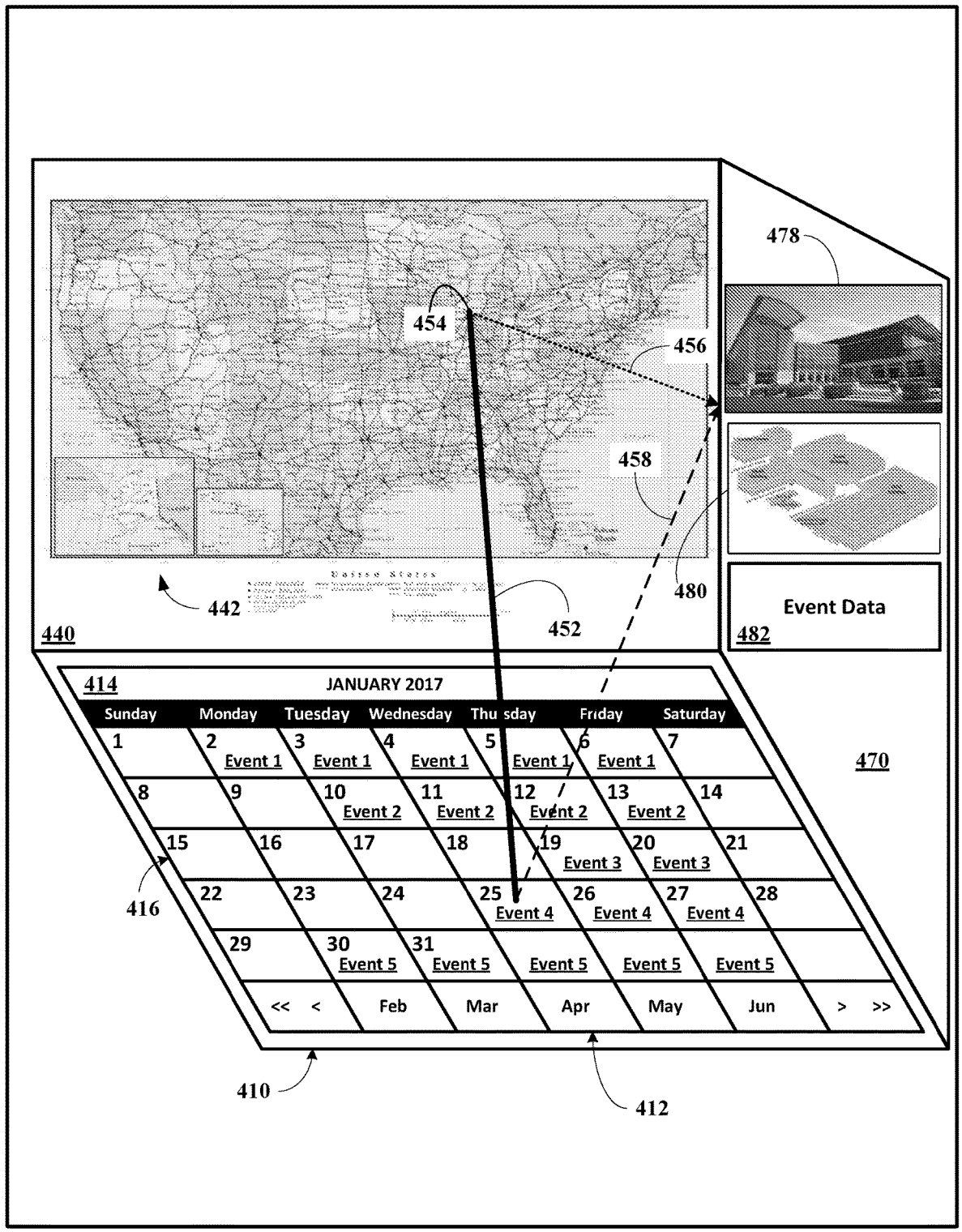

Looking at FIG. 4C, the display screen 400 evidences motion or a second motion sensed within the active zone of the motion sensor, where the motion or second motion either comprises a hold over one of the Event 4 icons or moves towards one of the Event 4 icons in a manner that Event 4 is distinguished from all of the other events. Once the processing unit determines that the motion is sufficient to discriminate the selection of Event 4 from the other events, a ray or a light beam 452 emanates from the Event 4 icon to a location 454 on the map 442 corresponding to the location of event, here Chicago. As shown here, the ray or beam 452 is shown as having a thickness corresponding to the duration of the event—3 day event, 3 pt line thickness. Additionally, if the motion was in a direction that the processing unit could not distinguished between more than one event, then the processing unit would move the event icon is such as way to permit further motion to permit event icon discrimination as set forth herein above. Simultaneously or sequentially, the processing unit also displays information in the event data window 470. The information shown here includes a picture of the venue 478, a schematic layout of the venue 480, and an event 1 data box 482. When activated, the box 482 may display event data including event schedule, event speakers, and other event information. Simultaneously or sequentially, the processing unit may also generate a ray or beam 458 (shown here as a dotted line) emanating from the location 454 to the event data window 470 and/or a ray or beam 460 (shown here as a dashed line) emanating from Event 4 to the event data window 470.

Figure 4D:
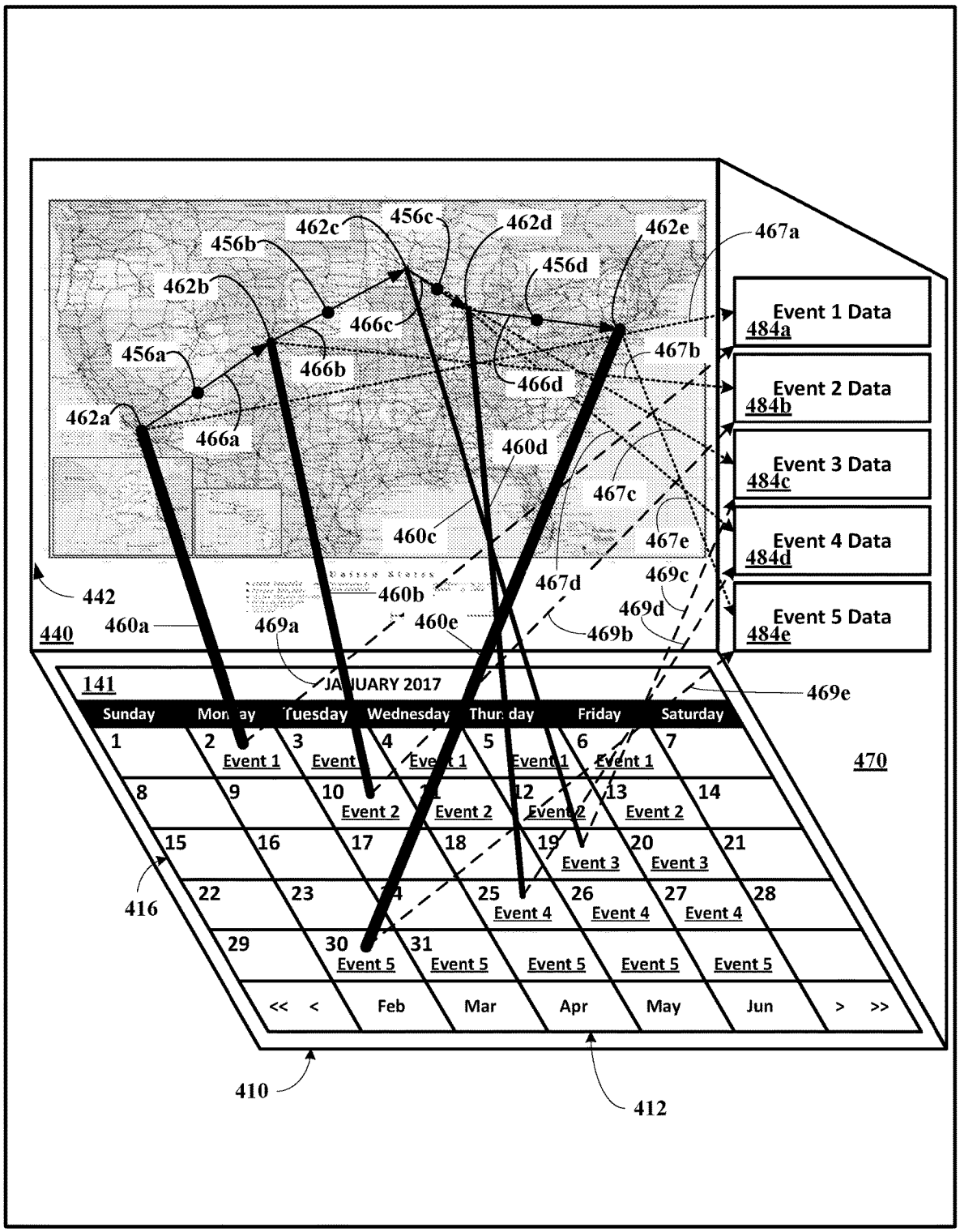

Looking at FIG. 4D, the display screen 400 evidences motion or a second motion sensed within the active zone of the motion sensor, where the motion or second motion either comprises a hold over the month banner 414 or moves towards the month banner 414 in a manner that the month banner 414 is distinguished from all of the other selectable objects including the events, the days, the hot zones, and the forward and backward month and year icons. Once the processing unit determines that the motion is sufficient to discriminate the selection of the month banner 414 from the other selectable objects, rays or light beams 462*a-e* emanate from all of the first event icon of each Event 1-5 to locations 464*a-e* on the map 442 corresponding to the location of each event, here Los Angeles, Denver, Minneapolis, Chicago, and New York, respectively. The processing unit also causes line segments 466*a-d* to be drawn connecting the city locations 264*a-e* in a sequence corresponding to the event dates. The processing unit may also display hot zones 468*a-d* represented here by circles that when activated display relevant travel information for traveling between each location. Alternatively, the processing unit may be configured to treat each line segment 466*a-d* has a hot zone so that motion towards or onto the line would result in the display of relevant travel information. The rays or beams 462*a-e* have thickness reflecting the duration of the event. Five day events have 6 pt line thickness; four day events have 4.5 pt line thickness; three day events have 3 pt line thickness; two day events have 2.25 pt line thickness; and one day events have 1.5 pt line thickness. Further it should be recognized that the events and associated rays or beams may be and in general would be color coded to better distinguish the events. Additionally, the color coding may be indicative of the type of event. Event data may include not only specific information about the event, but may also include information about the event location, information on how to get to the event, information about the city in which the event is occurring and any other relevant information about the event, the location, the city, the people or companies in attending the event, or any other information the user may desire to be displayed. Simultaneously or sequentially, the processing unit also displays information in the event data window 470. The information shown here includes an Event 1 Data box 484*a*, an Event 2 Data box 484*b*, an Event 3 Data box 484*c*, an Event 4 Data box 484*d*, and an Event 5 Data box 484*e*. Simultaneously or sequentially, the processing unit may also generate a ray or beam 467*a-e* (shown here as a dotted line) emanating from the locations 464*a-e* to the event data window 470 and/or a ray or beam 469*a-e* (shown here as a dashed line) emanating from Event 1-5 to the event data window 470.

CLOSING

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method implemented on a system including a motion sensor, a display device, and a processing unit comprising:
   receiving, at the processing unit, a first input from the motion sensor;
   in response to the first input, displaying, via the processing unit, a calendar and a map on the display device, wherein the calendar includes a plurality of events;
   determining, via the processing unit, that the first input corresponds to motion towards a particular event on the calendar to a certainty greater than 50%; and
   simultaneously or sequentially generating, via the processing unit, and displaying on the display device a ray or beam emanating from the particular event to a location on the map corresponding to a location of the particular event.

2. The method of claim 1, further comprising:
   receiving, at the processing unit, a further input from the motion sensor;
   determining, via the processing unit, that the further input corresponds to motion towards a further particular event on the calendar to a certainty greater than 50%; and
   simultaneously or sequentially generating, via the processing unit, and displaying on the display device a further ray or beam emanating from the further particular event to a further location on the map corresponding to a location of the further particular event.

3. The method of claim 2, further comprising:
   simultaneously or sequentially generating, via the processing unit, and display on the display device a line connecting the first location to the further location evidencing a direction of travel from the first location to the further location.

4. The method of claim 2, further comprising:
   repeating the steps of claims 1 and 2, via the processing unit, until all desired events and associated rays or beams are determined, generated, and displayed on the display device.

5. The method of claim 3, further comprising:
repeating the steps of claims 1, 2 and 3 until, via the processing unit, all desired events and associated rays or beams, and all connecting lines are determined, generated, and displayed on the display device.

6. The method of claim 1, further comprising:
displaying, via the processing unit, event related data in an event data field on the display device.

7. The method of claim 2, further comprising:
displaying, via the processing unit, event related data in an event data field on the display device.

8. The method of claim 3, further comprising:
displaying, via the processing unit, event related data in an event data field on the display device.

9. The method of claim 1, wherein, in the generating and displaying step, the calendar and the map are displayed in a two dimensional format with the calendar displayed on top of the map or the map is displayed on top of the calendar.

10. The method of claim 1, wherein, in the generating and displaying step, the calendar and the map are displayed in a three dimensional format with the map displayed in an xz-plane and the calendar displayed in an xy-plane.

11. The method of claim 6, wherein, in the generating and displaying step, the calendar, the map, and the event are displayed in a two dimensional format with (a) the calendar displayed on top of the map and the map on top of the event data field or (b) the map is displayed on top of the calendar and the calendar on top of the event data field.

12. The method of claim 6, wherein, in the generating and displaying step, the calendar and the map are displayed in a three dimensional format with the map displayed in an xz-plane, the calendar displayed in an xy-plane, and the event data field is displayed on an yz-plane.

13. The method of claim 11, further comprising:
displaying, via the processing unit, lines extending from the events to the event data displayed on in the event data field and lines extending from the associated locations to the event data displayed in the event data field on the display device.

14. The method of claim 12, further comprising:
displaying, via the processing unit, lines extending from events to event data displayed in the event data field and lines extending from the associated locations to the event data displayed in the event data field on the display device.

15. A mobile device comprising:
a display device;
a motion sensor; and
a processor configured to:
responsive to a first input from the motion sensor:
display a calendar and a map on the display device, wherein the calendar includes a plurality of events
determine that the first input corresponds to motion towards a particular event on the calendar to a certainty greater than 50%;
generate a ray or beam emanating from the particular event to a location on the map corresponding to a location of the particular event; and
display the ray or beam on the display device.

16. A system comprising:
a display device configured to:
display a calendar, a map, and event data in two-dimensions or in three-dimensions; and
a processor, coupled to the display device and configured to:
receive a first input from a motion sensor,
cause the display device to display the calendar, the map, and the event data, where the calendar includes a plurality of events and the map includes correlated event locations,
determine that the first input corresponds to motion towards a particular event on the calendar to a certainty greater than 50%,
generate a ray or beam emanating from the particular event to a location on the map corresponding to a location of the particular event,
display the ray or beam on the display device,
generate a line from the particular event to associated event data and a line from the location on the map to the associated event data, and
display the lines on the display device.

17. The device of claim 15, further comprising:
the processor further configured to:
receive a further input from the motion sensor;
determine that the further input corresponds to motion towards a further particular event on the calendar to a certainty greater than 50%; and
simultaneously or sequentially generate and display on the display device a further ray or beam emanating from the further particular event to a further location on the map corresponding to a location of the further particular event.

18. The device of claim 17, further comprising:
the processor further configured to:
simultaneously or sequentially generate and display on the display device a line connecting the first location to the further location evidencing a direction of travel from the first location to the further location.

19. The system of claim 16, further comprising:
the processor further configured to:
receive a further input from the motion sensor;
determine that the further input corresponds to motion towards a further particular event on the calendar to a certainty greater than 50%; and
simultaneously or sequentially generate and display on the display device a further ray or beam emanating from the further particular event to a further location on the map corresponding to a location of the further particular event.

20. The system of claim 19, further comprising:
the processor further configured to:
simultaneously or sequentially generate and display on the display device a line connecting the first location to the further location evidencing a direction of travel from the first location to the further location.

* * * * *